US011132538B2

(12) United States Patent
Shimauchi et al.

(10) Patent No.: US 11,132,538 B2
(45) Date of Patent: Sep. 28, 2021

(54) IMAGE PROCESSING APPARATUS, IMAGE PROCESSING SYSTEM, AND IMAGE PROCESSING METHOD

(71) Applicant: SONY CORPORATION, Tokyo (JP)

(72) Inventors: Kazuhiro Shimauchi, Tokyo (JP); Takashi Kohashi, Tokyo (JP); Masakazu Ebihara, Tokyo (JP); Yuji Ono, Kanagawa (JP); Hidetoshi Nagano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 270 days.

(21) Appl. No.: 16/310,678

(22) PCT Filed: May 30, 2017

(86) PCT No.: PCT/JP2017/020053
§ 371 (c)(1),
(2) Date: Dec. 17, 2018

(87) PCT Pub. No.: WO2017/221644
PCT Pub. Date: Dec. 28, 2017

(65) Prior Publication Data
US 2019/0384969 A1    Dec. 19, 2019

(30) Foreign Application Priority Data

Jun. 22, 2016    (JP) .............................. JP2016-123246

(51) Int. Cl.
*G06K 9/00* (2006.01)
*G06T 7/246* (2017.01)
*G06K 9/46* (2006.01)

(52) U.S. Cl.
CPC ....... *G06K 9/00369* (2013.01); *G06K 9/4642* (2013.01); *G06T 7/248* (2017.01);
(Continued)

(58) Field of Classification Search
None
See application file for complete search history.

(56) References Cited

U.S. PATENT DOCUMENTS 9,269,012 B2 *   2/2016  Fotland ................ G06K 9/3241
2007/0160293 A1   7/2007  Ishikawa et al.
(Continued)

FOREIGN PATENT DOCUMENTS

CN         102004918 A      4/2011
JP         2005-049979 A    2/2005
(Continued)

OTHER PUBLICATIONS

Alyammahi, Sohailah, et al. "People detection and articulated pose estimation framework for crowded scenes." Knowledge-Based Systems 131 (2017): 83-104. (Year: 2017).*

(Continued)

*Primary Examiner* — Andrae S Allison
(74) *Attorney, Agent, or Firm* — Chip Law Group

(57) ABSTRACT

A pre-determination process is executed for setting a person determination detection frame in a moving body detection frame surrounding a moving body region detected from an image and determining whether the image in the person determination detection frame is a person and a final determination process of analyzing a distribution state in a moving body detection frame determined to include a person in the pre-determination process and finally determining whether the image in the person determination detection frame is a person based on an analysis result. In the final determination process, an occupancy rate in a specific region in the moving body detection frame determined to include a person in the pre-determination process is calculated, and the image in the person determination detection frame is determined to be a person based on the occupancy rate.

14 Claims, 27 Drawing Sheets

(52) U.S. Cl.
CPC ............... *G06T 2207/10016* (2013.01); *G06T 2207/20021* (2013.01); *G06T 2207/30196* (2013.01); *G06T 2207/30232* (2013.01)

(56) References Cited

U.S. PATENT DOCUMENTS

| | | | | |
|---|---|---|---|---|
| 2010/0296697 | A1* | 11/2010 | Ikenoue | H04N 7/18 382/103 |
| 2011/0050939 | A1 | 3/2011 | Tsurumi et al. | |
| 2014/0219503 | A1 | 8/2014 | Watanabe et al. | |
| 2015/0077326 | A1* | 3/2015 | Kramer | G06F 3/0325 345/156 |
| 2016/0117840 | A1 | 4/2016 | Yamamoto | |
| 2016/0224829 | A1* | 8/2016 | Chou | G06T 7/11 |
| 2018/0144499 | A1* | 5/2018 | Watanabe | G06T 7/593 |
| 2018/0330481 | A1* | 11/2018 | Watanabe | G06T 5/006 |
| 2019/0258852 | A1* | 8/2019 | Shimauchi | G06T 7/20 |

FOREIGN PATENT DOCUMENTS

| | | |
|---|---|---|
| JP | 2007-164720 A | 6/2007 |
| JP | 2010-062942 A | 3/2010 |
| JP | 2011-053915 A | 3/2011 |
| JP | 2011-209794 A | 10/2011 |
| JP | 5179132 B2 | 4/2013 |
| JP | 2016-085487 A | 5/2016 |
| WO | 2013/057904 A1 | 4/2013 |

OTHER PUBLICATIONS

International Search Report and Written Opinion of PCT Application No. PCT/JP2017/020053, dated Aug. 29, 2017, 08 pages of ISRWO.

Office Action for JP Patent Application No. 2018-523635, dated May 25, 2021, 2 pages of Office Action and 2 pages of English Translation.

* cited by examiner

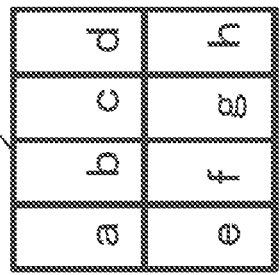

151 DIVISIONAL SMALL REGION SETTING WINDOW

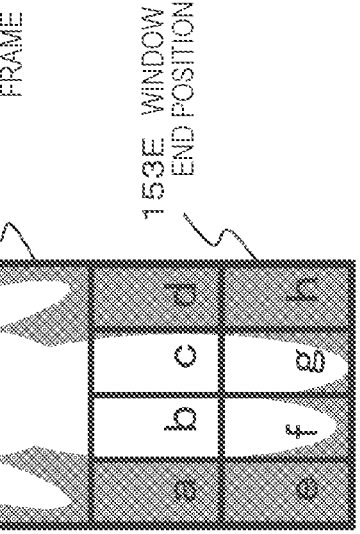

FIG. 9B EXAMPLE OF SETTING WINDOW IN MOVING BODY DETECTION FRAME AND MOVING WINDOW

153S WINDOW START POSITION
144 FOURTH MOVING BODY DETECTION FRAME
153E WINDOW END POSITION

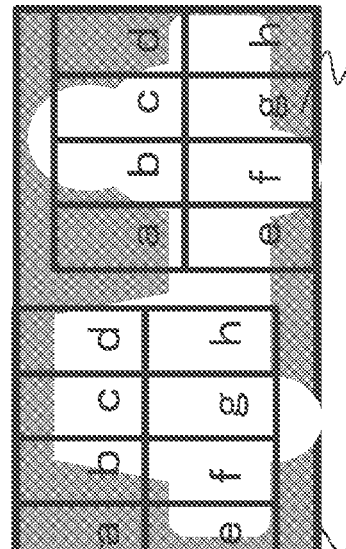

FIG. 9A EXAMPLE OF SETTING WINDOW IN MOVING BODY DETECTION FRAME AND MOVING WINDOW

152E WINDOW END POSITION
152S WINDOW START POSITION
143 THIRD MOVING BODY DETECTION FRAME

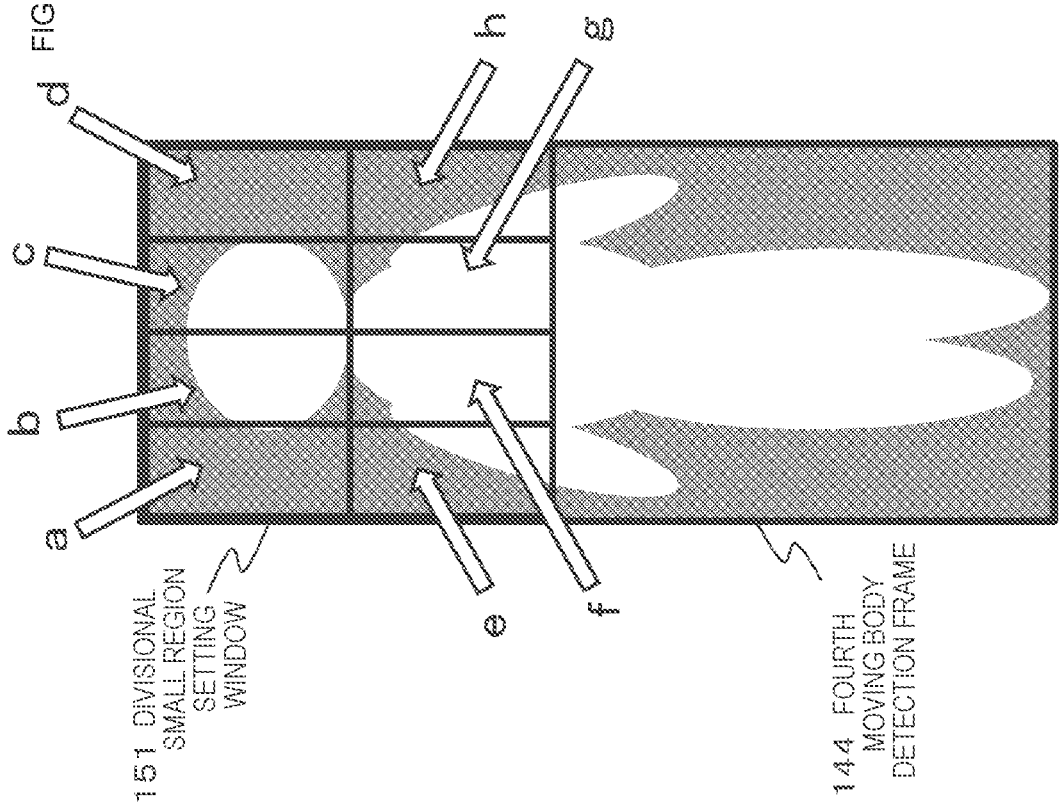

FIG. 10A  NUMBER OF MOVING BODY PIXELS OF EACH DIVISIONAL SMALL REGION

| SMALL REGION | MOVING BODY PIXEL COUNT NUMBER OF EACH SMALL REGION |
|---|---|
| (a) | 100 |
| (b) | 3000 |
| (c) | 3000 |
| (d) | 50 |
| (e) | 1000 |
| (f) | 4500 |
| (g) | 4500 |
| (h) | 1000 |

FIG. 10B  MOVING BODY PIXEL PROPORTION THRESHOLD VALUE OF EACH DIVISIONAL SMALL REGION

| SMALL REGION | MOVING BODY PIXEL PROPORTION THRESHOLD VALUE OF EACH SMALL REGION |
|---|---|
| (a) | 0~5% |
| (b) | 40~60% |
| (c) | 40~60% |
| (d) | 0~5% |
| (e) | 5~25% |
| (f) | 60~100% |
| (g) | 60~100% |
| (h) | 5~25% |

151 DIVISIONAL SMALL REGION SETTING WINDOW

144 FOURTH MOVING BODY DETECTION FRAME

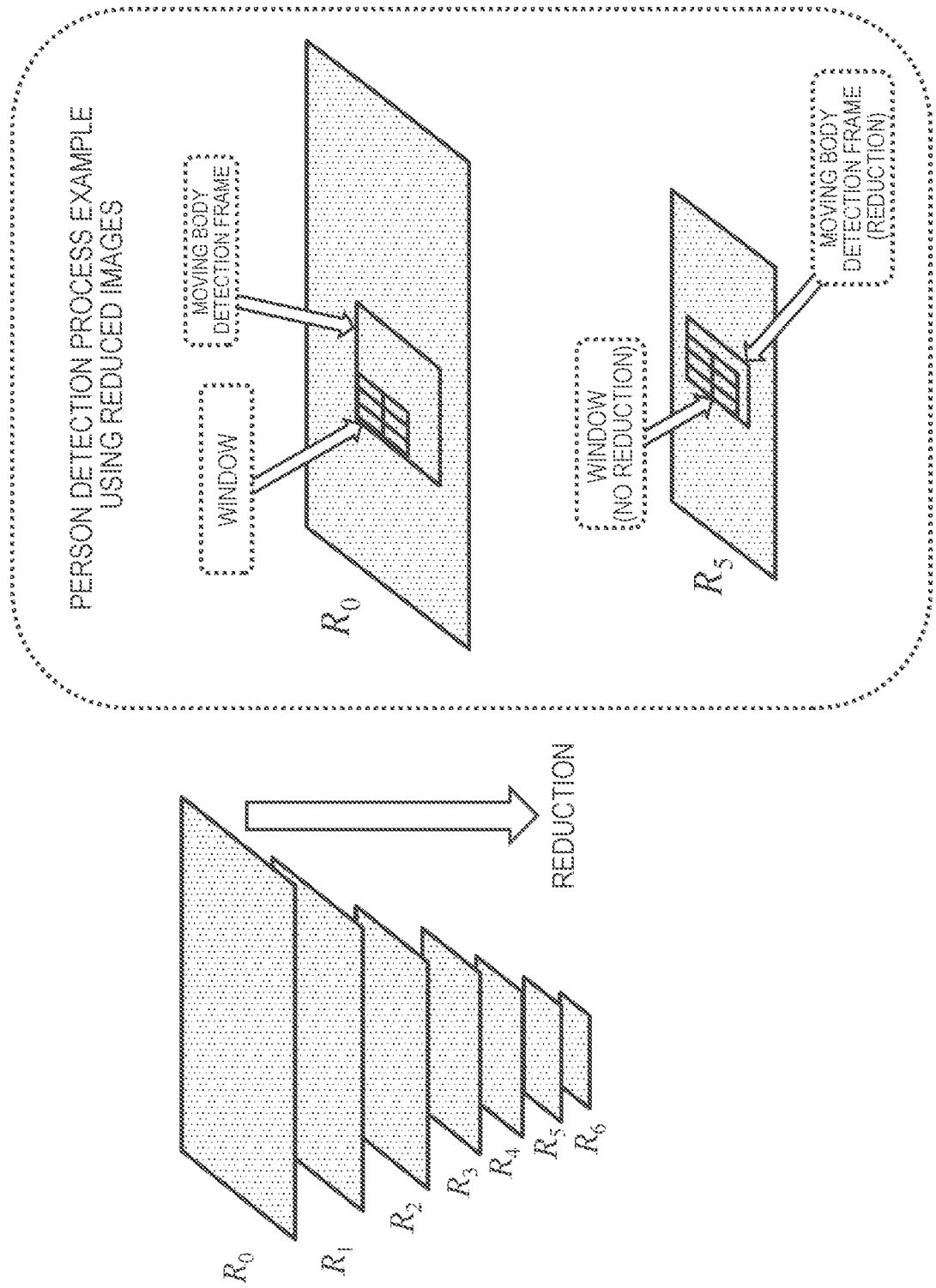

FIG. 15

FIRST PERSON CANDIDATE POINT LIST (EXAMPLE 1)

| FIRST PERSON CANDIDATE POINT IDENTIFIER (ID) | x COORDINATES ($R_0$ LAYER IMAGE CORRESPONDING COORDINATE WITH NO REDUCTION) | y COORDINATES ($R_0$ LAYER IMAGE CORRESPONDING COORDINATE WITH NO REDUCTION) | WINDOW WIDTH ($R_0$ LAYER IMAGE CORRESPONDING SIZE WITH NO REDUCTION) | WINDOW HEIGHT ($R_0$ LAYER IMAGE CORRESPONDING SIZE WITH NO REDUCTION) |
|---|---|---|---|---|
| 0 | 200 | 250 | 40 | 40 |
| 1 | 300 | 400 | 80 | 80 |
| 2 | 5 | 100 | 40 | 40 |
| 3 | 128 | 256 | 40 | 40 |
| 4 | 48 | 72 | 160 | 160 |

(CASE IN WHICH WINDOW SIZE IS 40×40, AND REDUCTION RATE OF SINGLE IMAGE REDUCTION PROCESS IS 1/2)

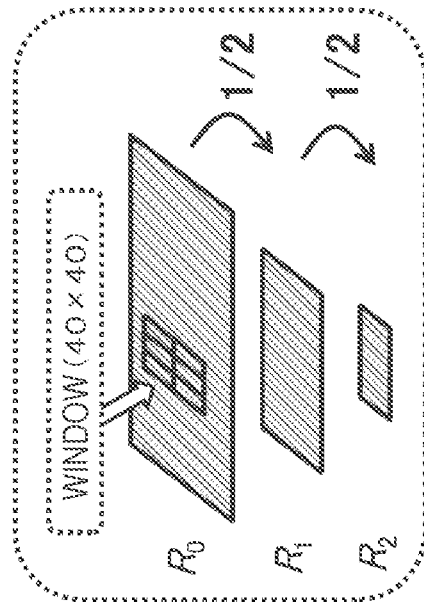

FIG. 16

FIRST PERSON CANDIDATE POINT LIST (EXAMPLE 2)

| FIRST PERSON CANDIDATE POINT IDENTIFIER (ID) | x COORDINATES (R₀ LAYER IMAGE CORRESPONDING COORDINATE WITH NO REDUCTION) | y COORDINATES (R₀ LAYER IMAGE CORRESPONDING COORDINATE WITH NO REDUCTION) | DETECTED HIERARCHICAL IMAGE |
|---|---|---|---|
| 0 | 200 | 250 | $R_0$ |
| 1 | 300 | 400 | $R_1$ |
| 2 | 5 | 100 | $R_0$ |
| 3 | 128 | 256 | $R_0$ |
| 4 | 48 | 72 | $R_2$ |

(CASE IN WHICH WINDOW SIZE IS 40x40, AND REDUCTION RATE OF SINGLE IMAGE REDUCTION PROCESS IS 1/2)

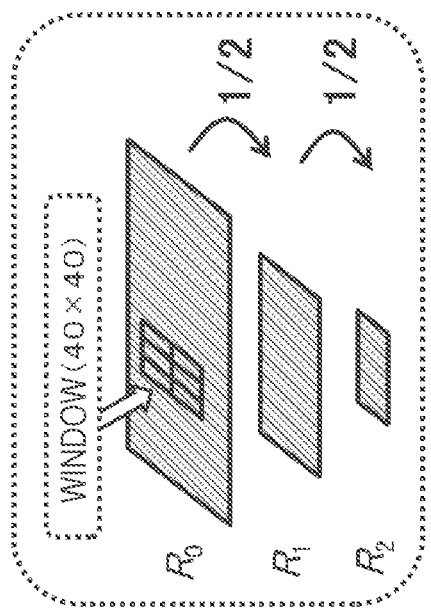

FIG. 23

SECOND PERSON CANDIDATE POINT LIST

| SECOND PERSON CANDIDATE POINT IDENTIFIER (ID) | x COORDINATES ($R_0$ LAYER IMAGE CORRESPONDING COORDINATE WITH NO REDUCTION) | y COORDINATES ($R_0$ LAYER IMAGE CORRESPONDING COORDINATE WITH NO REDUCTION) | DETECTED HIERARCHICAL IMAGE |
|---|---|---|---|
| 0 | 200 | 250 | $R_0$ |
| 1 | 300 | 400 | $R_1$ |
| 2 | 5 | 100 | $R_0$ |
| 3 | 128 | 256 | $R_0$ |
| 4 | 48 | 72 | $R_2$ |

IMAGE PROCESSING APPARATUS, IMAGE PROCESSING SYSTEM, AND IMAGE PROCESSING METHOD

CROSS REFERENCE TO RELATED APPLICATIONS

This application is a U.S. National Phase of International Patent Application No. PCT/JP2017/020053 filed on May 30, 2017, which claims priority benefit of Japanese Patent Application No. JP 2016-123246 filed in the Japan Patent Office on Jun. 22, 2016. Each of the above-referenced applications is hereby incorporated herein by reference in its entirety.

TECHNICAL FIELD

The present disclosure relates to an image processing apparatus, an image processing system, an image processing method, and a program. More particularly, the present disclosure relates to an image processing apparatus, an image processing system, an image processing method, and a program which are capable of executing a person detection process from image.

BACKGROUND ART

Recently, monitoring cameras have been installed in stations, buildings, public roads, and various other places. Captured images of the monitoring cameras are transmitted to a server via, for example, a network, stored in a storage device such as a database, and used for various types of data processing to which an information terminal connected to a server or a network is applied.

For example, data processing executed by the server or the information terminal is a process of searching for and tracking a specific person.

In a monitoring system using such a monitoring camera, various kinds of detection processes such as moving body detection, face detection, person detection, or the like are combined and used as a process for detecting a specific object such as a person from captured image data.

For example, a process of detecting and tracking a person or the like from a camera-captured image is used for investigating a suspicious person or a criminal in various cases.

Generally, a process of detecting a person from an image takes much computation, and thus it is difficult to execute the process in a monitoring camera. In many current monitoring systems, a captured image of a monitoring camera is transmitted to a server via a network, and a person detection process is executed using images accumulated on a server side.

For example, a configuration in which a plurality of cameras are connected with sensors such as a temperature detection sensor via a network, images and sensor information obtained from these devices are aggregated in a server, and a human body detection process is performed is disclosed in Patent Literature 1 (JP 2011-209794A).

However, when videos of a plurality of monitoring cameras are centrally processed, a load on the server is heavy, a video analysis cost becomes enormous, the necessity to use a large-scale system arises, and as a result, there arises a problem in that, for example, a processing time necessary for criminal detection increases.

A configuration example for resolving such an increase in server load is disclosed in Patent Literature 2 (JP 5179132B).

Specifically, a person detection process is executed in each monitoring camera on the basis of a captured image of each monitoring camera, and only a result thereof is transmitted to a server. It is a distributed processing type system in which the server extracts a person having a specific feature such as a specific article of clothing using only a personal detection result received from each monitoring camera.

However, an amount of data processing which can be executed in each monitoring camera is limited. In the configuration described in Patent Literature 2, each monitoring camera performs the person detection process of detecting a moving body as a person in a case in which the moving body is continuously detected in a predetermined number of frames.

However, in the person detection process, erroneous detection in which all non-human moving bodies such as cars and animals are detected as persons frequently occurs.

As a result, many erroneous detection results are accumulated in the server, and a new load from the server having to execute a determination process for correct person detection result data and erroneous detection result data arises.

Further, a configuration in which each monitoring camera executes person detection in which moving body detection and face detection are combined, and in a case in which a person is detected by the combined process, an abnormality detection signal is output to a server side connected to a network connection is disclosed in Patent Literature 3 (JP 2010-062942A).

However, in the configuration described in this Patent Literature 3, the face detection is performed for the determination of the person detection, and as a result, there is a problem in that an image not including a face such as a backside image of a person is unable to be used for the person detection even though a person is included in the image.

Further, in Patent Literature 3, a face detection circuit may be replaced with a human body detection circuit, but there is no mention of a specific person detection configuration in that case.

CITATION LIST

Patent Literature

Patent Literature 1: JP 2011-209794A
Patent Literature 2: JP 5179132B
Patent Literature 3: JP 2010-062942A

DISCLOSURE OF INVENTION

Technical Problem

The present disclosure was made, for example, in light of the above-mentioned problems, and it is an object of the present disclosure to provide an image processing apparatus, an image processing system, an image processing method, and a program which are capable of realizing a high-accuracy person detection process with less computation.

In one embodiment of the present disclosure, for example, an image processing apparatus, an image processing system, an image processing method, and a program which enable each monitoring camera connected with a server via a network to execute a high-accuracy person detection process with less computation and transmit a personal detection result to the server or the like are provided.

Solution to Problem

A first aspect of the present disclosure resides in an image processing apparatus, including: a data processing unit configured to execute a person detection process from an image. The data processing unit executes a pre-determination process of setting a person determination detection frame in a moving body detection frame surrounding a moving body region detected from the image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result.

Further, a second aspect of the present disclosure resides in an image processing system, including: a camera that captures an image; and a server connected with the camera via a network. The camera includes a data processing unit configured to execute a person detection process from the captured image. The data processing unit executes a pre-determination process of setting a person determination detection frame in a moving body detection frame surrounding a moving body region detected from the captured image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result, and generates metadata in which object type information indicating whether or not a moving body obtained as a result of the final determination process is a person is recorded and transmits the metadata to the server.

Further, a third aspect of the present disclosure resides in an image processing system, including: a camera that captures an image; and a server and an information terminal connected with the camera via a network. The camera includes a data processing unit configured to execute a person detection process from the captured image. The data processing unit executes a pre-determination process of setting a person determination detection frame in a moving body detection frame surrounding a moving body region detected from the captured image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result, and generates metadata in which object type information indicating whether or not a moving body obtained as a result of the final determination process is a person is recorded and transmits the metadata to the server together with the captured image. The server stores the captured image and the metadata received from the camera in a storage unit, and executes an object search or tracking process to which the captured image and the metadata stored in the storage unit are applied in response to a processing request from the information terminal.

Further, a fourth aspect of the present disclosure resides in an image processing method executed in an image processing apparatus. The image processing apparatus includes a data processing unit configured to execute a person detection process from an image. The data processing unit executes a pre-determination process of setting a person determination detection frame in a moving body detection frame surrounding a moving body region detected from the image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result.

Further, a fifth aspect of the present disclosure resides in a program causing an image processing apparatus to execute image processing. The image processing apparatus includes a data processing unit configured to execute a person detection process from an image. The program causes the data processing unit to execute a pre-determination process of setting a person determination detection frame in a moving body detection frame surrounding a moving body region detected from the image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result.

Note that a program according to an embodiment of the present disclosure is, for example, a program provided in computer-readable format to an image processing device or a computer system capable of executing various program codes, the program being providable by a storage medium or communication medium. By providing such a program in a computer-readable format, processing corresponding to the program is realized on the image processing device or the computer system.

Further objectives, features, and advantages of the present disclosure will be clarified by a more detailed description based on the embodiments of the present disclosure described hereinafter and the attached drawings. Note that in this specification, the term "system" refers to a logical aggregate configuration of multiple devices, and the respective devices of the configuration are not limited to being inside the same housing.

Advantageous Effects of Invention

According to a configuration of an embodiment of the present disclosure, an apparatus and a method for executing a person detection process from an image through a light-weight calculation with a high degree of accuracy are realized.

Specifically, a pre-determination process of setting a person determination detection frame in a moving body detection frame surrounding a moving body region detected from the image and determining whether or not an image in the person determination detection frame is a person and a final determination process of analyzing a distribution state in a moving body detection frame of the person determination detection frame determined to include a person in the pre-determination process and finally determining whether or not the image in the person determination detection frame is a person on the basis of an analysis result are executed. For example, in the final determination process, an occupancy rate in a specific region in the moving body detection frame of the person determination detection frame determined to include a person in the pre-determination process is calculated, and the image in the person determination detection frame is finally determined to be a person in a case in which the occupancy rate is equal to or greater than a threshold value.

With this configuration, an apparatus and a method for executing a person detection process from an image through a lightweight calculation with a high degree of accuracy are realized.

Note that the advantageous effects described in this specification are merely for the sake of example and non-limiting, and there may be additional advantageous effects.

BRIEF DESCRIPTION OF DRAWINGS

FIGS. 9A and 9B are diagrams for describing a person detection process example to which a divisional small region setting window is applied.

FIGS. 10A and 10B are diagrams for describing a person detection process example to which a divisional small region setting window is applied.

FIG. 14 is a diagram for describing a person detection process example to which a divisional small region setting window is applied.

FIG. 15 is a diagram for describing an example of a first person candidate point list.

FIG. 16 is a diagram for describing an example of a first person candidate point list.

FIG. 23 is a diagram illustrating an example of a second person candidate point list.

MODE(S) FOR CARRYING OUT THE INVENTION

Figure 1:
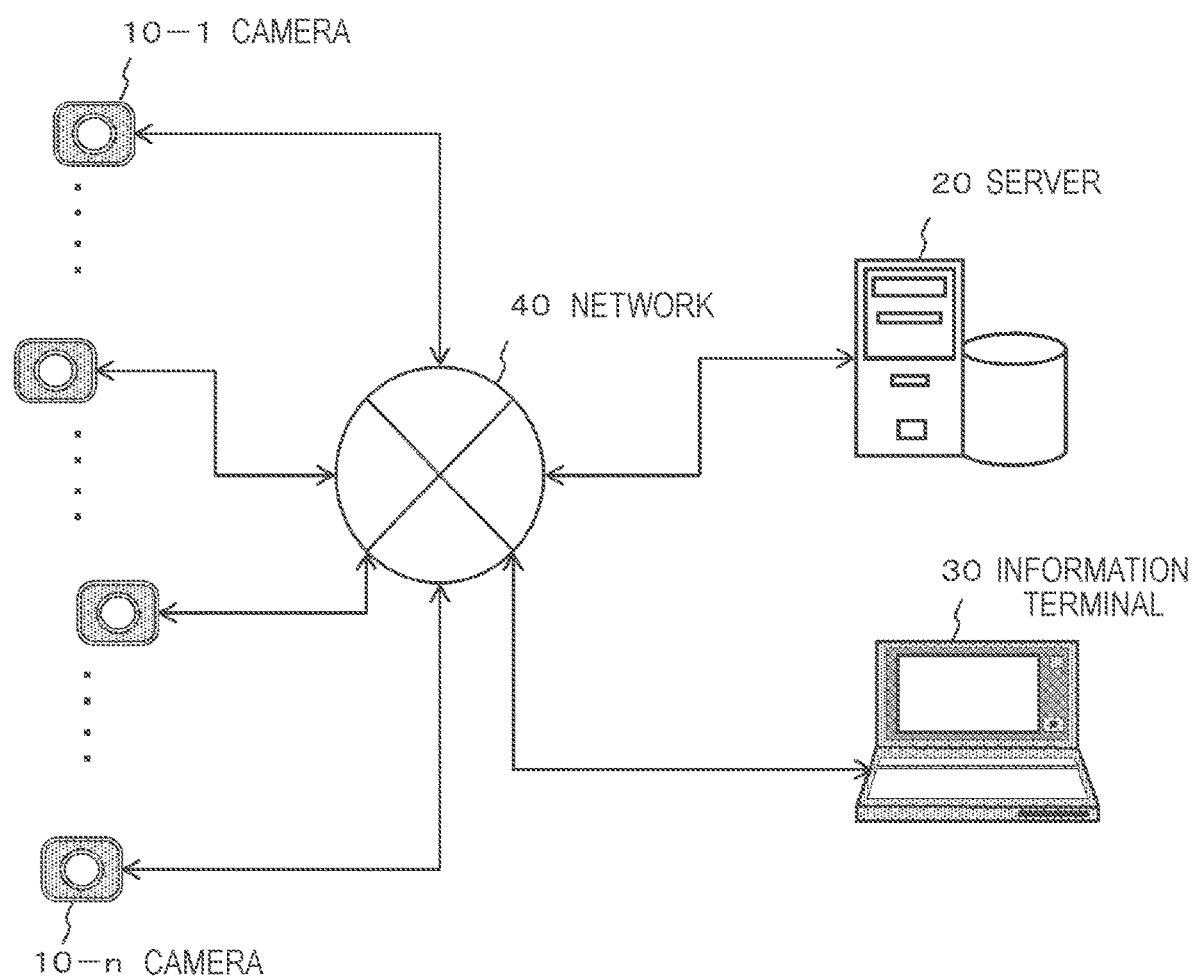
FIG. 1 is a diagram for describing an example of an image processing system to which image processing of the present disclosure can be applied.

Hereinafter, an image processing apparatus, an image processing system, an image processing method, and a program of the present disclosure will be described in detail with reference to the appended drawings. Further, the description will proceed in accordance with the following items.

1. Configuration example of image processing system to which process of present disclosure is applicable
2. Configuration example of image processing apparatus
3. Specific process executed by image processing apparatus
4. Details of first person detection process executed by image processing apparatus
5. Details of second person detection process executed by image processing apparatus
6. Details of final verification process and metadata generation process executed by image processing apparatus
7. Other embodiments
8. Conclusion of configuration of present disclosure

[1. Configuration Example of Image Processing System to Which Process of Present Disclosure is Applicable]

First, a configuration example of an image processing system to which a process of the present disclosure is applicable will be described.

FIG. 1 is a diagram illustrating a configuration example of an image processing system to which a process of the present disclosure is applicable.

In an image processing system illustrated in FIG. 1, at least one camera 10-1 to 10-n, a server 20, and an information terminal 30 are connected via a network 40.

Each of the cameras 10-1 to 10-n captures, records and analyzes a video, and generates and outputs video data and information (metadata) obtained as a video analysis result via the network 40.

The server 20 receives a captured image (video) and metadata corresponding to the image from each camera 10 via the network 40, accumulates them in a storage unit (database), receives a user instruction such as a search request from the information terminal 30, and performs data processing.

The server 20 executes data processing such as a search process or a tracking process for a specific object in an image, for example, a specific person using the captured image and the metadata received from each of the cameras 10-1 to 10-n, for example, in accordance with the user instruction input from the information terminal 30.

The information terminal 30 receives an instruction from a user, for example, instruction information such as a search request for a specific person, and transmits the received instruction information to the server 20 via the network 40. Further, the information terminal 30 receives a search result, an image, search/tracking result information, or the like serving as a tracking result from the server 20, and executes a process of outputting the image, the information, or the like to a display.

Further, although an example in which the server 20 and the information terminal 30 are configured separately is illustrated in FIG. 1, a configuration in which a single information processing apparatus having functions of the information terminal 30 and the server 20 is set may be provided.

Further, although only one server 20 and one information terminal 30 are illustrated in FIG. 1, various configurations in which a plurality of servers 20 or information terminals 30 are connected to the network 40, various information processing is executed in each server and each information terminal, and processing results are transmitted and received between each server and each information terminal may be provided.

Next, an example of data transmitted from each of the cameras 10-1 to 10-n to the server 20 will be described with reference to FIG. 2.

Further, the cameras 10-1 to 10-n can transmit data to the information terminal 30 as well as the server 20.

Figure 2:
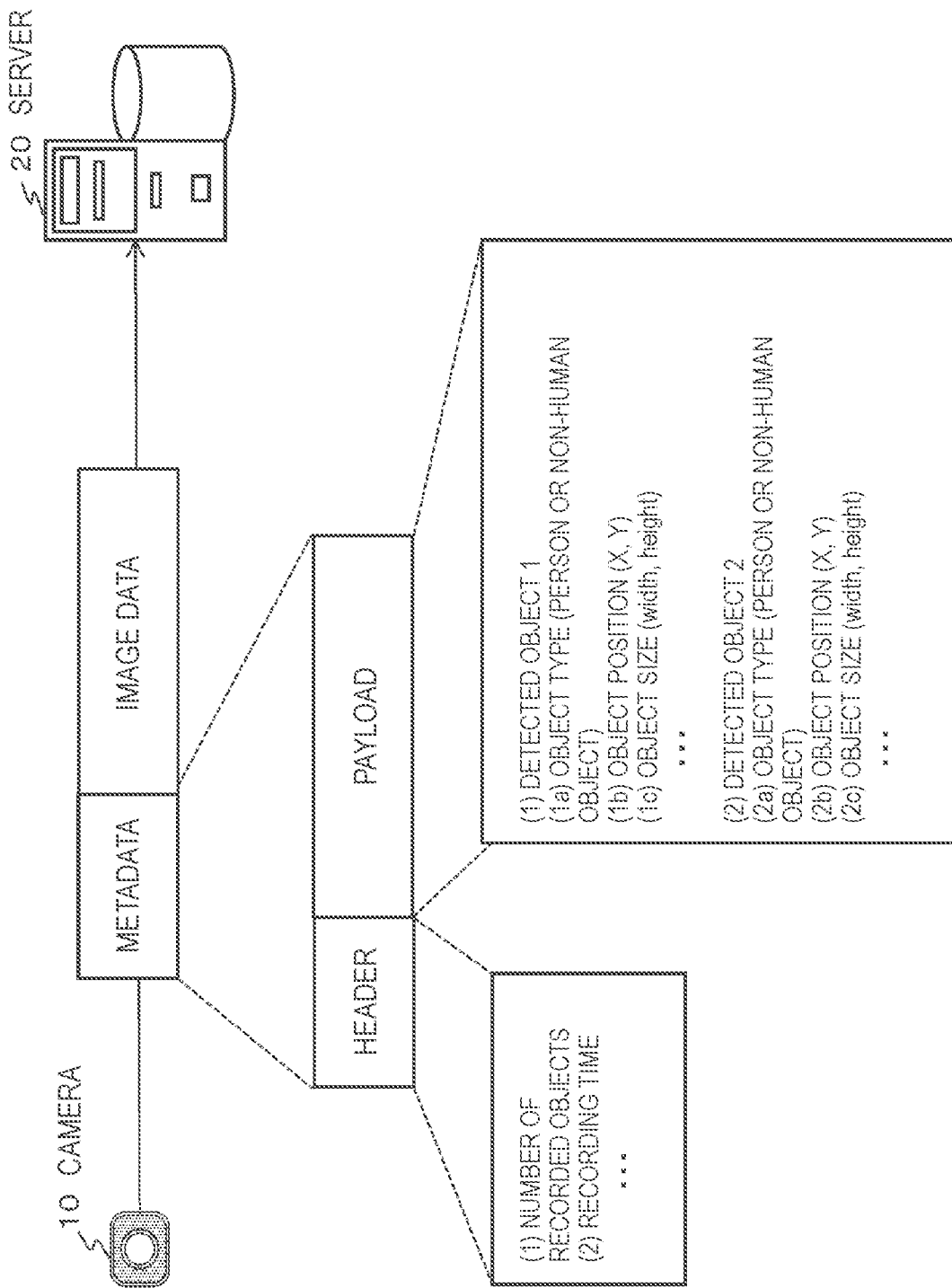
FIG. 2 is a diagram for describing metadata generated by an image processing apparatus (camera).

As illustrated in FIG. 2, the camera 10 transmits metadata and image data.

The image data is an image captured by the camera 10, specifically, an image frame constituting a moving image. The metadata is data corresponding to each image frame and set in units of image frames.

The metadata includes various types of information related to an associated image frame.

As illustrated in FIG. 2, in the metadata, a header is recorded at the beginning, and thereafter a payload in which detection information from an image frame, specifically, information related to a person or other moving body objects, or the like is recorded is set.

As illustrated in FIG. 2, the header includes information necessary for reading object data detected from an image, for example, the number of recorded objects or information common to all objects, for example, recording time information and the like.

Further, data of detected object units detected from an image frame associated with the metadata, specifically, for example, the following object corresponding data, is recorded in the payload of the metadata as illustrated in FIG. 2:

(1) a type of object (a person or a non-human object);
(2) an object position (x, y coordinate information); and
(3) an object size (a width and a height).

For example, such object information is recorded in units of objects detected from the image frame.

The camera 10 which is an example of the image processing apparatus of the present disclosure performs a process of capturing an image, generating metadata related to the captured image illustrated in FIG. 2, and transmitting the metadata to the server or the like together with the image.

In other words, in the image processing system of the present disclosure, each camera that captures an image executes image analysis on the captured image, generates metadata based on the analysis result, and transmits the metadata.

Further, the image analysis process executed by the camera 10 is an analysis process including the following processes:

(a) a moving body detection process of determining whether or not a moving body is included in a captured image; and (b) a person determination process of determining whether or not the detected moving body is a person or a non-human object (for example, a car or the like).

Specific process examples thereof will be described later.

Figure 3:
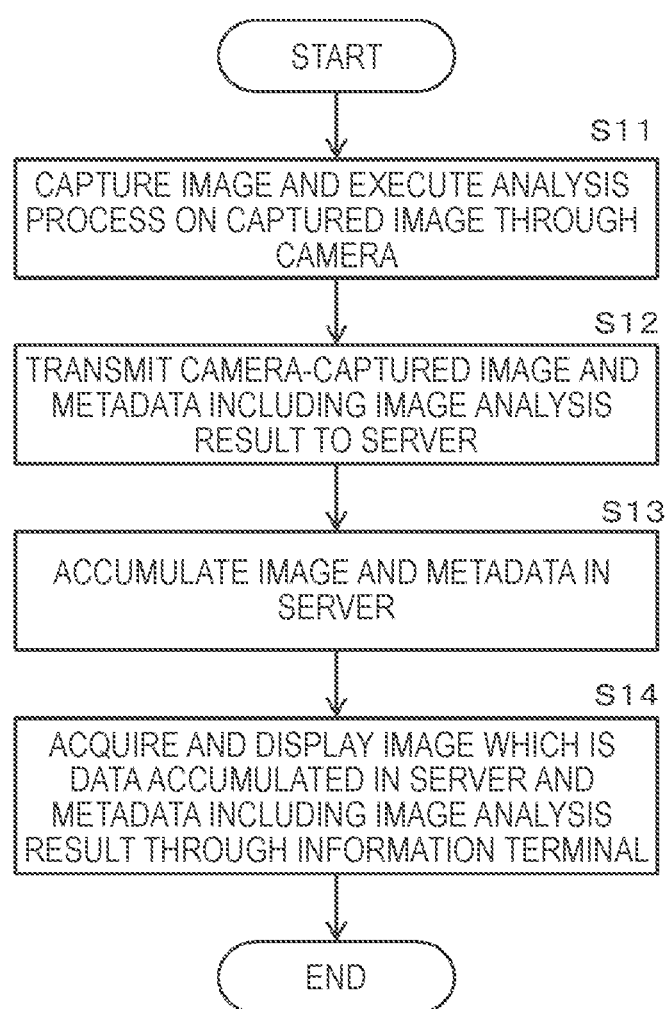
FIG. 3 is a flowchart for describing a processing sequence executed by an image processing system.

A flowchart illustrated in FIG. 3 is a flowchart for describing an example of a processing sequence of a process executed by the image processing system illustrated in FIG. 1.

Processes of respective steps will be described.

(Step S11)

First, each of the cameras 10-1 to 10-n connected to the network 40 captures an image and executes the analysis process on the captured image.

As described above, for example, the following image analysis process is executed:

(a) a moving body detection process of determining whether or not a moving body is included in a captured image; and (b) a person determination process of determining whether or not the detected moving body is a person or a non-human object (for example, a car or the like).

(Step S12)

Further, the cameras 10-1 to 10-n transmit the camera-captured image and the metadata including the analysis result based on the captured image to the server 20 via the network 40.

(Step S13)

The server 20 stores the image data and the metadata associated with the image received from the cameras 10-1 to 10-n in a storage unit in the server 20.

(Step S14)

Then, the information terminal 30 acquires the image accumulated in the server 20 and the metadata including the image analysis result, and displays the image and the metadata on the display unit.

Specifically, for example, a display process for identification information indicating whether or not each object included in the display image is the moving body and further display information allowing it to be identified whether or not the moving body object is a person in a case in which the object is the moving body are executed in accordance with the display of the captured image of the camera.

Further, the server 20 and the information terminal 30 can analyze the image and the metadata if necessary. For example, a configuration of performing an analysis process which is not performed in each camera 10, a process which supplements analysis performed in each camera 10, extraction of information useful for the user, or a process of visualizing information of metadata to be superimposed on an image and displaying the information of the metadata may be provided. For example, it is a display process of causing a frame to be superimposed on an object whose object type is a person.

Further, the server 20 may be configured to transmit display data which is obtained by visualizing information such as an image accumulated in the storage unit or information such as an object type serving as an analysis result and superimposed on the image to the information terminal 30 via the network 40.

The information terminal 30 can selectively or entirely acquire data received from the server 20 and output the data to a display or the like.

The information terminal 30 can selectively or entirely receive the metadata or the information useful for the user, for example, a photographing time, statistical information of an analysis result, or the like, from the server 20, perform processing and a process necessary in the information terminal, and output the resulting data on the display.

Figure 4:
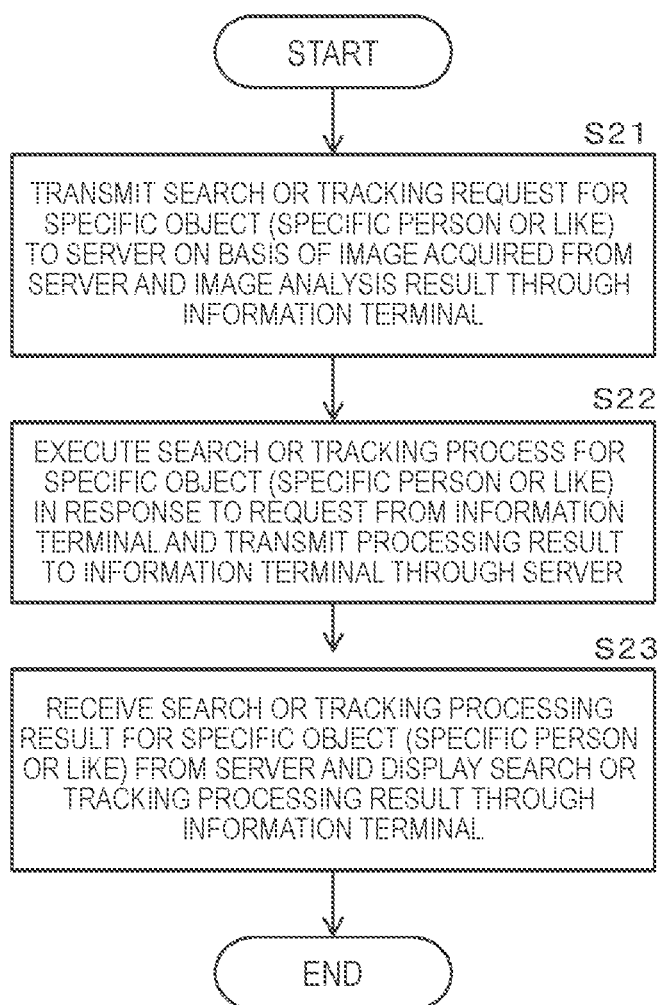
FIG. 4 is a flowchart for describing a processing sequence executed by an image processing system.

A flowchart illustrated in FIG. 4 is a flowchart for describing one process example of a process in which a processing request is transmitted from the information terminal 30 to the server 20, and the data processing is executed in the server.

Processes of respective steps will be described.
(Step S21)

In step S21, the information terminal 30 transmits a search or tracking processing request for a specific object, for example, a specific person, to the server 20 on the basis of the image and the image analysis result acquired from the server 20.
(Step S22)

Upon receiving the processing request from the information terminal 30, in step S22, the server 20 executes the search or tracking processing request for the specific object, for example, the specific person, and transmits the processing result to the information terminal 30.
(Step S23)

Upon receiving the processing result from the server information 20, in step S23, the information terminal 30 displays a result of the search or tracking process for the specific object, for example, the specific person acquired as the processing result, on the display.

For example, a display process for an image in which an identification frame is set only for a specific person who is set as a tracking target is executed.

[2. Configuration Example of Image Processing Apparatus]

Next, a configuration example of the camera which is an example of the image processing apparatus of the present disclosure will be described with reference to FIG. 5.

Figure 5:
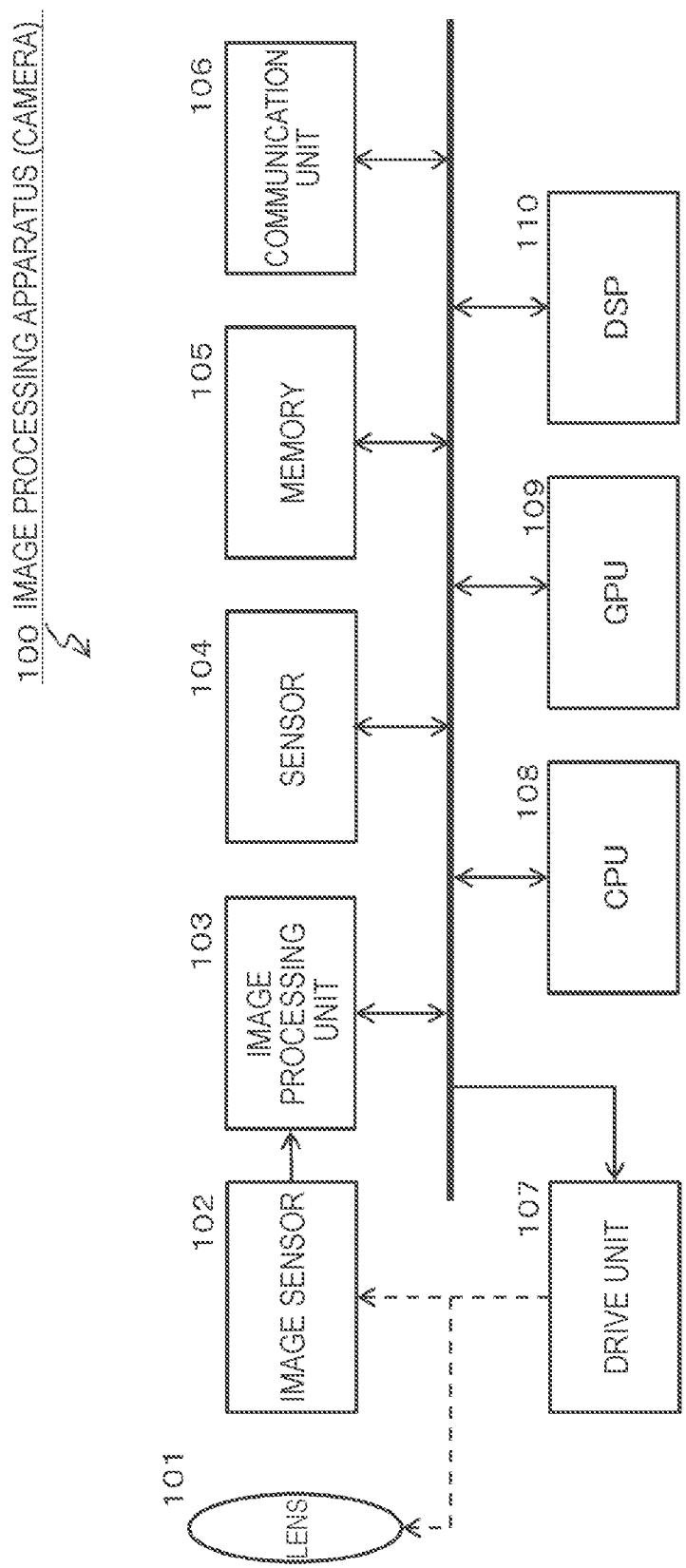
FIG. 5 is a diagram for describing a configuration example of an image processing apparatus (camera).

FIG. 5 is a block diagram illustrating one configuration example of an image processing apparatus (camera) 100 of the present disclosure. The image processing apparatus (camera) 100 corresponds to the camera 10 illustrated in FIG. 1.

As illustrated in FIG. 5, the image processing apparatus (camera) 100 includes a lens 101, an image sensor 102, an image processing unit 103, a sensor 104, a memory 105, a communication unit 106, a drive unit 107, a CPU 108, a GPU 109, and a DSP 110.

A captured image is input to the image sensor 102 via the lens 101.

The image sensor 102 is, for example, a charge coupled device (CCD) image sensor, a complementary metal oxide semiconductor (CMOS) image sensor, or the like.

The image processing unit 103 receives image data (RAW image) output from the image sensor 102, and performs signal processing in a common camera such as a demosaic process for setting pixel values corresponding to all colors of RGB to respective pixel positions of a RAW image, white balance (WB) adjustment, gamma correction, and the like in addition to a noise reduction process for reducing a noise included in the input RAW image.

The sensor 104 is a sensor for performing image capturing with an optimum setting, for example, a luminance sensor or the like, and an imaging mode of image capturing is controlled in accordance with detection information of the sensor 104.

The memory 106 is a memory constituted a RAM, a ROM, or the like which is used as a storage region of a captured image, a processing programs executed in the image processing apparatus 100, various kinds of parameters, and the like.

The communication unit 106 is a communication unit used for a communication process via the network 40 with the server 20 or the information terminal 30 illustrated in FIG. 1.

The drive unit 107 performs various driving processes necessary for image capturing such as lens driving, diaphragm control, and the like for image capturing. For example, the driving process is executed under the control of the CPU 108 by using the detection information of the sensor 104.

The CPU 108 controls various processes such as image capturing, image analysis, metadata generation, a communication process, and the like executed by the image processing apparatus (camera) 100. The CPU 108 functions as a data processing unit that executes various processes in accordance with the data processing program stored in the memory 105.

A graphic processor unit (GPU) 109 and a digital signal processor (DSP) 110 are, for example, processors for executing image processing and the like on the captured image and are used for analysis process of captured images and the like. Similarly to the CPU 108, each of the GPU 109 and the DSP 110 functions as a data processing unit that executes various image processing in accordance with the data processing program stored in the memory 105.

Further, the image processing apparatus (camera) 100 of the present disclosure performs a moving body detection process or a person detection process from the captured image.

The data processing is executed by applying the image processing unit 103, the CPU 108, the GPU 109, the DSP 110, and the like which function as the data processing unit. The processing program applied to the data processing is stored in the memory 105.

Further, for example, a dedicated hardware circuit may be installed in the image processing unit 103, and the moving body detection or person detection process may be executed by applying dedicated hardware.

Further, the process may be executed by appropriately combining a process according to dedicated hardware and a software application process according to a program.

[3. Specific Process Executed by Image Processing Apparatus]

Next, a specific process executed by the image processing apparatus (camera) will be described.

Figure 6:
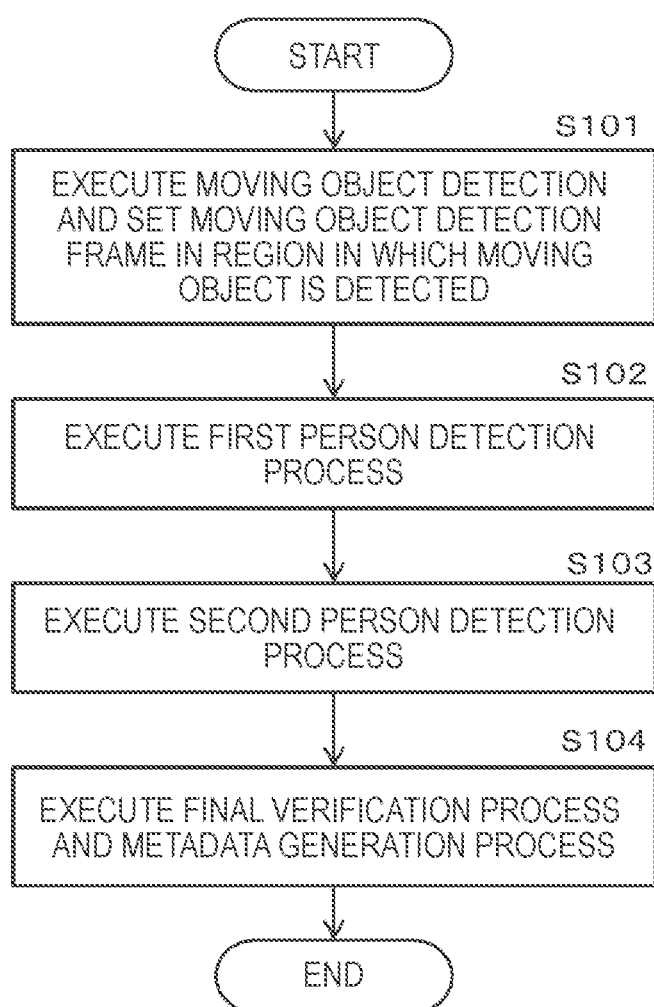
FIG. 6 is a flowchart for describing a processing sequence of a process executed by an image processing apparatus.

FIG. 6 is a flowchart illustrating a processing sequence of the person detection process from the captured image executed by the image processing apparatus (camera).

In the person detection process of the present disclosure, since personal detection based on image analysis can be performed even by a camera with a relatively low data processing function as well as an information processing apparatus with a high data processing function such as a PC, a significant reduction in computation which is necessary in the person detection process is implemented.

For example, in a case in which an attempt to perform the person detection from the captured image of the camera is made, in a general process of a related art, a feature quantity is calculated for each pixel constituting image, and a collation process of the calculated feature quantity and a learning dictionary in which feature data of an image of a person is registered is performed.

The feature quantity calculation process and the dictionary collation process are generally performed for all pixels in an image or all pixels in which the moving body is detected and are factors of increasing a processing load.

Further, persons of different sizes are photographed in a captured image in accordance with a distance from the camera. In order to detect image region of persons of various sizes, it is necessary to convert an image to images of different resolutions and carry out a collation process with a dictionary hierarchically for each of images of different resolutions.

With these processes, it is necessary to perform the feature quantity calculation process and the dictionary collation process twice or more, and the processing load further increases.

In order to alleviate an excessive processing load of the person detection process according to the related art, in the process of the present disclosure, a simple "first person detection process" with small computation is executed in advance, and a process of narrowing down a pixel region estimated to be a person, that is, a first person candidate point from a captured image is performed.

Thereafter, the feature quantity calculation and the dictionary collation process in which only the first person candidate point and neighbor pixel regions are set as processing targets are executed as a "second person detection process."

As such a two-step process is performed, a configuration in which a necessary processing amount is reduced as compared with the person detection process of the related art, and erroneous detection can be also further reduced is implemented.

The person detection process of the present disclosure will be described below in detail.

FIG. 6 is a flowchart illustrating the entire sequence of the person detection process from the captured image executed by the image processing apparatus (camera) of the present disclosure.

A process of each step of the flow will be described below.
(Step S101)

In step S101, the image processing apparatus (camera) first executes the moving body detection process from the captured image and performs a process of separating the moving body from the background.

Figure 7:
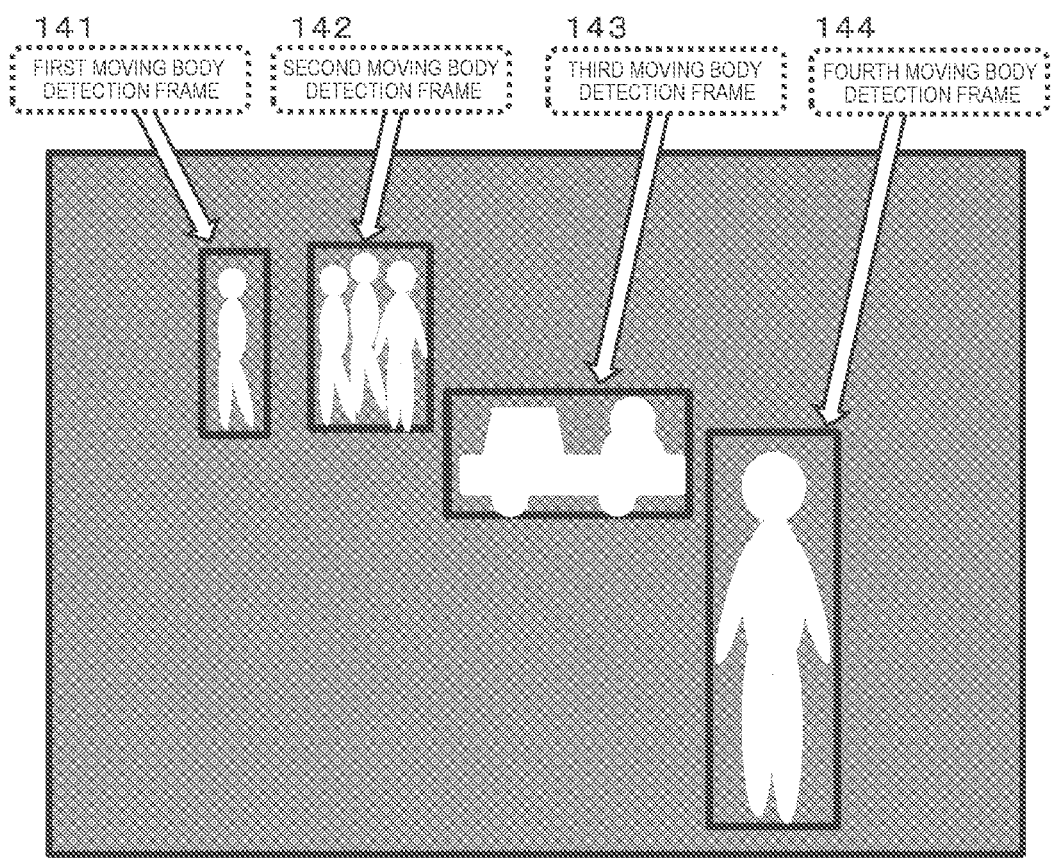
FIG. 7 is a diagram for describing a moving body detection process example.

A common technique known from the past such as a background difference method can be applied as the moving body detection. FIG. 7 illustrates a data example of a result of executing the moving body detection process on the image.

As a result of the moving body detection process, as illustrated in FIG. 7, a silhouette of the moving body of a pixel unit can be obtained.

Further, a frame externally contacting the moving body, that is, a moving body detection frame can be also obtained.

FIG. 7 illustrates four moving body detection frames, that is, first to fourth moving body detection frames 141 to 144.

Here, the moving bodies are certain objects moving to the last and may be a person, a car, or erroneous detection such as trembling of trees, and types thereof are unable to be specified.

Further, a plurality of moving bodies may be adjacent or overlapping to form a silhouette or may be regarded as one moving body object.
(Step S102)

After the moving body detection process in step S101, in step S102, the "first person detection process" is executed using a moving body detection result.

As described above, in order to alleviate an excessive processing load of the person detection process according to the related art, in the process of the present disclosure, a simple "first person detection process" with small computation is executed in advance, and a process of narrowing down a pixel region estimated to be a person, that is, a "first person candidate point" from a captured image is performed.

Thereafter, the feature quantity calculation and the dictionary collation process in which only the "first person candidate point" and neighbor pixel regions are set as processing targets are executed as a "second person detection process."

The first person detection process in step S102 corresponds to the process of narrowing down the person candidate point described above.

The second person detection process in step S103 corresponds to the feature quantity calculation and the dictionary collation process in which the candidate point and the neighbor pixel regions are set as the processing target.

The first person detection process executed in step S102 can be executed through a lighter weight calculation than that of the second person detection process executed in step S103.

Further, the first person detection process will be described later in detail.

In step S102, the first person detection process is executed, and in a case in which one or more points serving as a person candidate (first person candidate points) are detected, a "first person candidate point list" in which coordinate position information of the detected "first person candidate point" or the like is recorded is generated.

The list will be described later in detail.
(Step S103)

After the moving body detection process in step S101 and the "first person detection process" in step S102, in step S103, the "second person detection process" is executed.

This process includes the feature quantity calculation in which only the pixel corresponding to the "first person candidate point" detected in step S102 and the neighbor pixel region thereof are set as the processing target and the dictionary collation process in which the calculated feature quantity and a registered feature quantity of a person image registered in a dictionary are compared and collated.

As the "second person detection process" executed in step S103, a general dictionary-based person detection method may be used.

Further, the "second person detection process" will also be described later in detail.

As described above, in the "second person detection process" in this step S103, the feature quantity calculation and the dictionary collation process in which the "first person candidate point and the neighbor pixels thereof" are set as the processing target are executed, and the processing amount can be greatly reduced as compared with the process of the related art in which all pixels of the image are set as the processing target.

The "second person detection process" is executed, and in a case in which one or more points serving as a person candidate (second person candidate points) are detected," a "second person candidate point list" in which coordinate position information of the detected "second person candidate point" or the like is recorded is generated.
(Step S104)

Finally, a final verification process and a metadata generation process are executed using the moving body detection frame obtained as a result of the moving body detection process executed in step S101 and each piece of information of the "second person candidate point" obtained as a result of the "second person detection process" in step S103.

The final verification process is a process for re-verifying whether or not the moving body in which the "second person candidate point" obtained as a result of the "second person detection process" in step S103 is set is really a "person," and for example, a process of detecting and removing erroneous detection data or a verification process using previous and next captured image frames is performed.

An installation state of a monitoring camera is not necessarily a condition suitable for person detection. For example, it may be an environment in which a shape of a person is unable to be photographed clearly in dark places or places in which sunshine or the weather changes. Further, an obstacle may appear between a person and a camera, or an occlusion region which is unable to be photographed by a camera occurs. There occur many situations in which it is difficult to identify a person such as an angle of depression of a camera, a photographed direction of a person, or the like.

An erroneously detected point which is not actually a person may be included in the "second person candidate point" obtained as a result of the "second person detection process" in step S103 due to these external factors. Further, points which should originally be detected as the second person candidate point may not be detected.

In this regard, in step S104, a process of re-verifying the "second person candidate point" detected in step S103 and finally performing final determination of whether or not the object in the moving body detection frame is a person.

Data of a "person" or a "non-human object" is recorded in the metadata, that is, the metadata described above with reference to FIG. 2 as the object type on the basis of the result obtained as a result of final determination.

[4. Details of First Person Detection Process Executed by Image Processing Apparatus]

Next, the "first person detection process" in step S102 described above with reference to the flowchart of FIG. 6 will be described in detail with reference to FIG. 8 and subsequent drawings.

Figure 8:
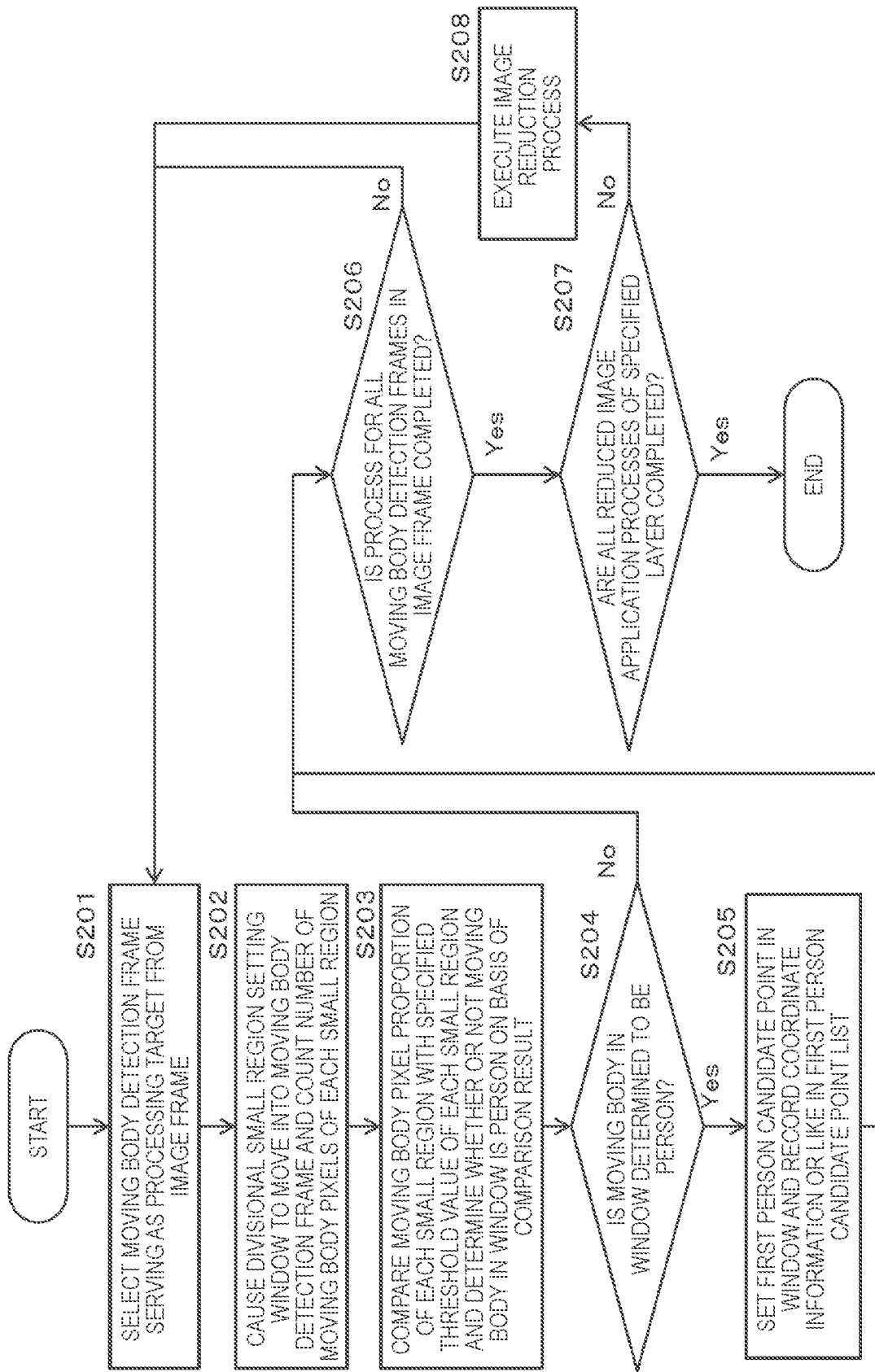
FIG. 8 is a flowchart for describing a processing sequence of a process executed by an image processing apparatus.

FIG. 8 is a flowchart for describing a detailed sequence of the "first person detection process" in step S102 described above with reference to the flowchart of FIG. 6.

Processes of respective steps of the flow illustrated in FIG. 8 will be sequentially described below.
(Step S201)

First, in step S201, the image processing apparatus (camera) selects a moving body detection frame of the processing target from the image frame of the captured image.

The moving body detection frame is the moving body detection frame detected in step S101 of the flow illustrated in FIG. 6 described above.

In step S101 of the flow illustrated in FIG. 6, for example, a plurality of moving body detection frames are set in the image as illustrated in FIG. 7.

In step S201, first, one moving body detection frame serving as the processing target is selected.
(Step S202)

Then, a process of setting the moving body detection frame selected as the processing target as the processing region, moving a divisional small region setting window in the moving body detection frame, and counting the number of moving body pixels per small region is executed.

This process will be described in detail with reference to FIGS. 9A and 9B.

FIGS. 9A and 9B illustrate a "divisional small region setting window 151" applied in the process of step S202 and an example of setting and moving the window for two moving body detection frames.

For example, as illustrated in FIGS. 9A and 9B, the divisional small region setting window 151 is a rectangular window which is divided into a plurality of rectangular small regions.

In the example illustrated in FIGS. 9A and 9B, the small regions include eight small regions a to h.

The window divided into the small regions is set in the moving body detection frame, and the number of moving body pixels included in each of the small regions a to g in the window is counted at the setting position.

Further, the window 151 is set to all settable positions in the moving body detection frame, and the process of counting the number of moving body pixels per small region is executed at each position.

For example, FIG. 9A is a diagram illustrating the moving body detection frame corresponding to the third moving body detection frame 143 illustrated in FIG. 7.

Pixel regions indicated by white in the third moving body detection frame 143 illustrated in FIG. 9A are the moving body pixels. Regions indicated by black are pixels having no motion, that is, non-moving body pixels.

The divisional small region setting window 151 is set to an upper left end of the third moving body detection frame 143 illustrated in FIG. 9A. This is the window start position 152S illustrated in FIGS. 9A and 9B.

At this position, the number of moving body pixels (=the number of pixels in the region indicated by white) included in each small region are counted for each of the small region a to g in the divisional small region setting window 151.

In a case in which the counting of the number of moving body pixels for the small regions a to g at a window start position 152S illustrated in FIGS. 9A and 9B ends, a count value is stored in the memory, and the divisional small region setting window 151 is moved to the right by one pixel.

At this movement position, the counting of the number of moving body pixels for the small regions a to g is similarly executed, and a count value is stored in memory.

Further, the divisional small region setting window 151 is moved to the right by one pixel, and a similar process is executed. If the window reaches the right end of the moving body detection frame, the window is then moved down by one pixel, a similar process is executed, the window is then moved to the left by one pixel, and a similar process is executed.

As described above, the window moving process and the active pixel counting process in units of small regions are repeatedly executed, and if the divisional small region setting window 151 reaches a window end position 152E at a lower right end of the third moving body detection frame 143 illustrated in FIG. 9A, and the moving body pixel counting process ends, the moving body pixel counting process in units of small regions for one moving body detection frame ends.

FIG. 9B is a diagram illustrating a moving body pixel counting process example in units of small regions to which the divisional small region setting window 151 for the fourth moving body detection frame 144 illustrated in FIG. 7 is applied.

In the example illustrated in FIG. 9B, since a horizontal width of the window coincides a horizontal width of the fourth moving body detection frame 144, the window 151 has an upper end of the moving body detection frame as a window start position 153S, counting of the number of moving body pixels of each small region starts, the window 151 is shifted downward by one pixel after the counting ends, and the counting process is performed at that position.

Thereafter, the window is sequentially shifted downward by one pixel, the moving body pixel counting process in units of small regions is repeated, and the divisional small region setting window 151 reaches a window end position 153E at the lower end of the moving body detection frame illustrated in FIG. 9B as illustrated in FIG. 9B, and the moving body pixel counting process, the moving body pixel counting process in units of small regions for one moving body detection frame ends.

Further, in the examples illustrated in FIGS. 9A and 9B, the start position and the end position of the divisional small region setting window are set to internally contact the moving body detection frame, but this is an example, and various settings can be performed for the start position and the end position of the divisional small region setting window. For example, the start position and the end position of the divisional small region setting window are set at positions protruding partially to the outside region of the moving body detection frame, and various settings can be performed.

(Step S203)

Then, in step S203, a process of determining whether or not the moving body of the moving body detection frame is a person using the count value of the number of moving body pixels of each small region at each window setting position is performed.

A moving body pixel proportion of each small region is compared with a predetermined threshold value of each small region, and it is determined whether or not the moving body in the moving body detection frame in which the window is set is a person on the basis of the comparison result.

This specific process example will be described with reference to FIGS. 10A and 10B.

FIGS. 10A and 10B illustrate a diagram similar to the fourth moving body detection frame 144 described above with reference to FIG. 9B and the small region setting window 151 set at the upper end of the fourth moving body detection frame 144.

As illustrated in FIGS. 10A and 10B, the divisional small region setting window 151 is divided into eight small regions a to g. In step S202, the number of moving body pixels (=white pixel regions) of the divisional small regions has already been counted, and count data is stored in the memory as the number of moving body pixels of each divisional small region of FIG. 10A.

For each divisional small region set in the divisional small region setting window 151, a threshold value is set in advance and stored in the memory.

The threshold value is a threshold value for determining whether or not an image in the window is a person.

An example of the threshold value is illustrated in FIG. 10B.

The moving body image proportion threshold value of each divisional small region of FIG. 10B is an example of a threshold value predefined for each divisional small region set in the divisional small region setting window 151.

It is a threshold value that specifies how many % of pixels among a total number of pixels of each small region are determined to be a moving body pixel.

The threshold value illustrated in FIG. 10B is an example of a threshold value for determining whether or not the moving body pixel in the window corresponds to an upper body (head to chest) region of a person.

In the example illustrated in FIG. 10B, the following threshold values are set:

threshold values of the small regions a and d are 0 to 5% of the moving body pixel proportion;

threshold values of the small regions b and c are 40 to 60% of the moving body pixel proportion;

threshold values of the small regions e and h are 5 to 25% of the moving body pixel proportion; and threshold values of the small regions f and g are 60 to 100% of the moving body pixel proportion.

The moving body pixel proportion of each small region calculated by applying the number of moving body pixels obtained by setting the window 151 illustrated in FIG. 10A and counting is compared with the predefined threshold value illustrated in FIG. 10B to determine whether or not the moving body in the window 151 is a person.

Figure 11:
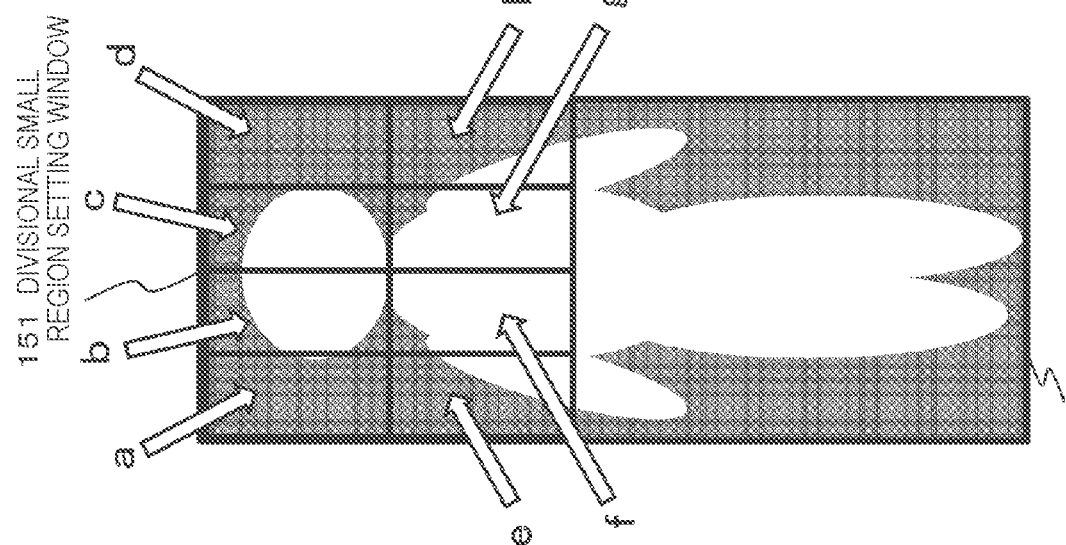
FIG. 11 is a diagram for describing a person detection process example to which a divisional small region setting window is applied.

A specific determination process example is illustrated in FIG. 11.

FIG. 11 illustrates the following data such as data calculated using the divisional small region setting window 151 set at the upper end of the fourth moving body detection frame 144:

(1) a moving body pixel count number of each small region;

(2) a moving body pixel proportion of each small region;

(3) a moving body pixel proportion threshold value of each small region; and (4) a determination result (a determination result of whether or not the moving body pixel proportion of each small region is in a threshold value range).

Further, in the example illustrated in FIG. 11, a total of the number of pixels of each small region is set to 5000.

In the example illustrated in FIG. 11, if the moving body pixel proportions of the small regions a to h in the window illustrated in FIG. 11(2) are compared with the threshold values illustrated in FIG. 11(3), all the moving body pixel proportions of the small regions a to h are in the range of the threshold value, and all the determination results of (4) are determined to be "Yes."

In this case, the moving body in the moving body detection frame in which the window is set is determined to be a person.

Further, in the example illustrated in FIG. 11, the moving body pixel proportion of the small regions a to g is all in the threshold value and the determination results of all small regions are determined as "Yes," but, A condition for determining that the moving body in the moving body detection frame is a person can be variously set, and it is not indispensable that the moving body pixel proportions of the small regions be all in the threshold value.

For example, if two third or more of the moving body pixel proportions of the small regions a to g are in the threshold value, it is determined to be a person, and various settings can be performed.

Further, the divisional small region setting windows 151 illustrated in FIGS. 9A, 9B, 10A, 10B, and 11 are the eight-divided windows for determining whether or not the moving body of the window setting region corresponds to the upper body (face to chest) of a person on the basis of the moving body pixel of each small region, but the number of settings or divisions of the window is one representative example used for person determination.

In addition to the divisional small region setting windows 151 illustrated in FIGS. 9A, 9B, 10A, 10B, and 11, various types of windows such as a windows covering from the head to the foot can be set, and various divisional small regions can be set in accordance with each window type.

In step S203 of the flowchart illustrated in FIG. 8, as described with reference to FIGS. 9A, 9B, 10A, 10B, and 11, it is determined whether or not the moving body of the moving body detection frame is a person using the count value of the number of moving body pixels of each small region at each window setting position. In other words, as illustrated in FIG. 11, the moving body pixel proportion of each small region is compared with the predefined threshold value of each small region, and it is determined whether or not the moving body in the moving body detection frame in which the window is set is a person on the basis of a comparison result.

(Step S204)

Step S204 is a bifurcation process according to whether or not the moving body in the window is determined to be a person in the determination process of step S203.

In a case in which the moving body in the window is determined to be a person in the determination process of step S203, step S204 is determined to be Yes, and the process proceeds to step S205.

On the other hand, in a case in which it is determined that the moving body in the window is determined not to be a person in the determination process of step S203, step S204 is determined to be No, and the process proceeds to step S206.

(Step S205)

The process of step S205 is a process executed in a case in which the moving body in the window is determined to be a person in the determination process of step S203.

In this case, in step S205, the "first person candidate point" is set in the window, and the coordinate information or the like of the "first person candidate point" is recorded in the first person candidate point list.

This process will be described with reference to FIG. 12.

Figure 12:
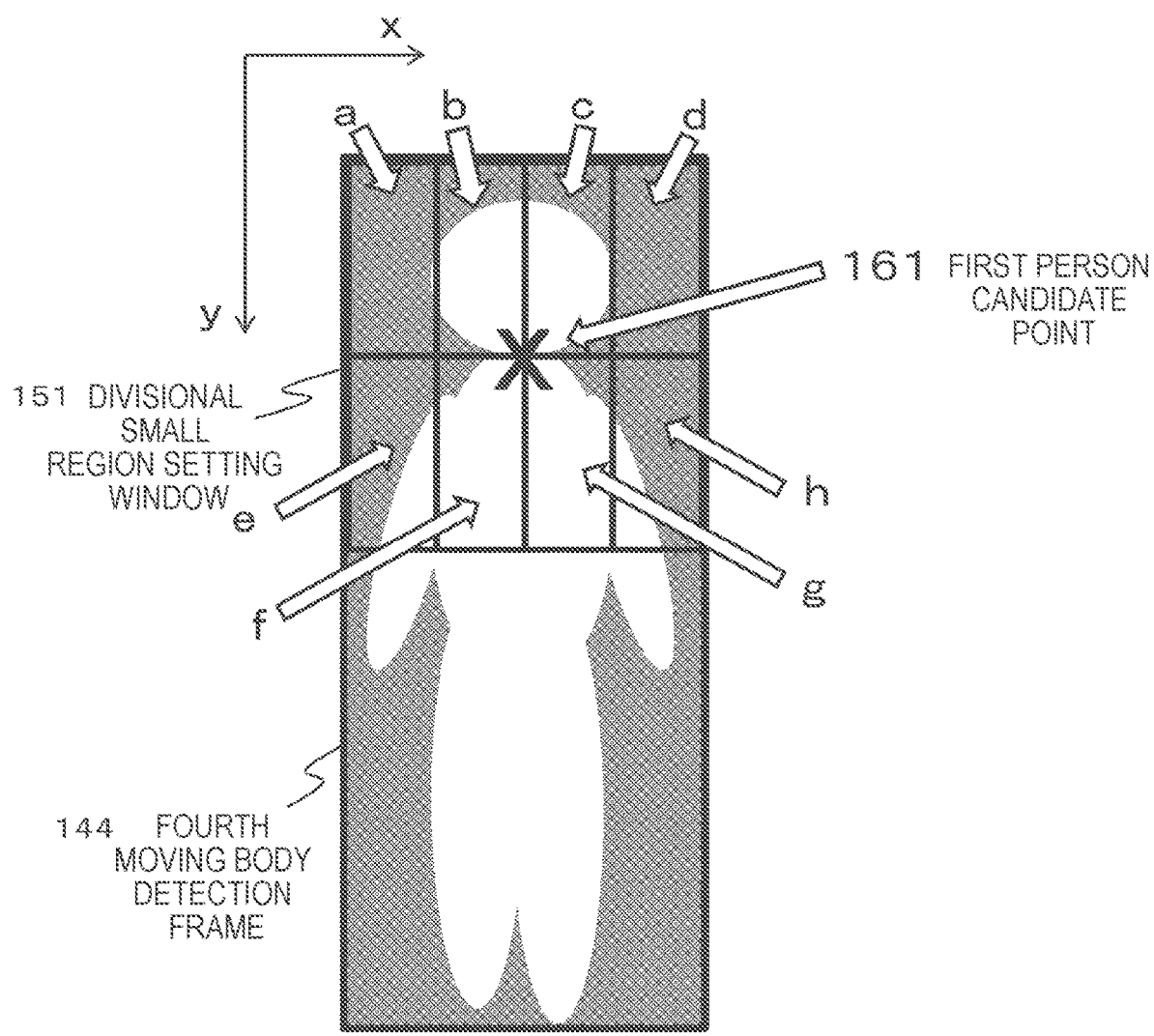
FIG. 12 is a diagram for describing a person detection process example to which a divisional small region setting window is applied.

FIG. 12 illustrates the fourth moving body detection frame 144 and the divisional small region setting window 151 set at the upper end of the fourth moving body detection frame 144, similarly to those described with reference to FIGS. 9A, 9B, 10A 10B, and 11.

It is assumed that the moving body in the window is determined to be a person at a position at which the divisional small region setting window 151 is set at the upper end of fourth moving body detection frame 144.

In this case, in step S205, the "first person candidate point" is set in the window, and the coordinate information or the like is recorded in the person candidate point list.

As illustrated in FIG. 12, the first person candidate point 161 is set, and the coordinate information (x, y) or the like of the first person candidate point 161 is registered in the "the first person candidate point list."

Further, the first person candidate point 161 is set to the center position of the divisional small region setting window 151, for example, at a position determined to be a person.

(Step S206)

In a case in which the setting of the "first person candidate point" and the list registration process are completed step S205 or in a case in which the moving body in the window is determined not to be a person in step S204, the process proceeds to step S206.

In step S206, it is determined whether or not all the processes for the moving body detection frame in the image frame serving as the processing target are completed.

In a case in which the processes are completed, the process proceeds to step S207.

In a case in which any one of the processes is not completed, the process returns to step S201, and the process for an unprocessed moving body detection frame is executed.

(Steps S207 and S208)

In a case in which it is determined in step S206 that all the processes for the moving body detection frame in the image frame serving as the processing target are completed, then in step S207, it is determined whether or not all reduced image application processes of a specified layer are completed.

In a case in which it is determined that all the reduced image application processes of the specified layer are completed, the process ends.

In a case in which it is determined that any one of the reduced image application processes of the specified layer is not completed, the process proceeds to step S208, the image reduction process is executed, the process returns to step S201, and the processes of step S201 and subsequent steps to which the reduced image is applied are executed.

A process examples in steps S207 and S208 will be described with reference to FIGS. 13 and 14.

The image reduction process executed in steps S207 and S208 is a process for causing the moving body pixel counting process based on the divisional small region setting window in steps S202 to S203 to be executed using the reduced image.

Figure 13:
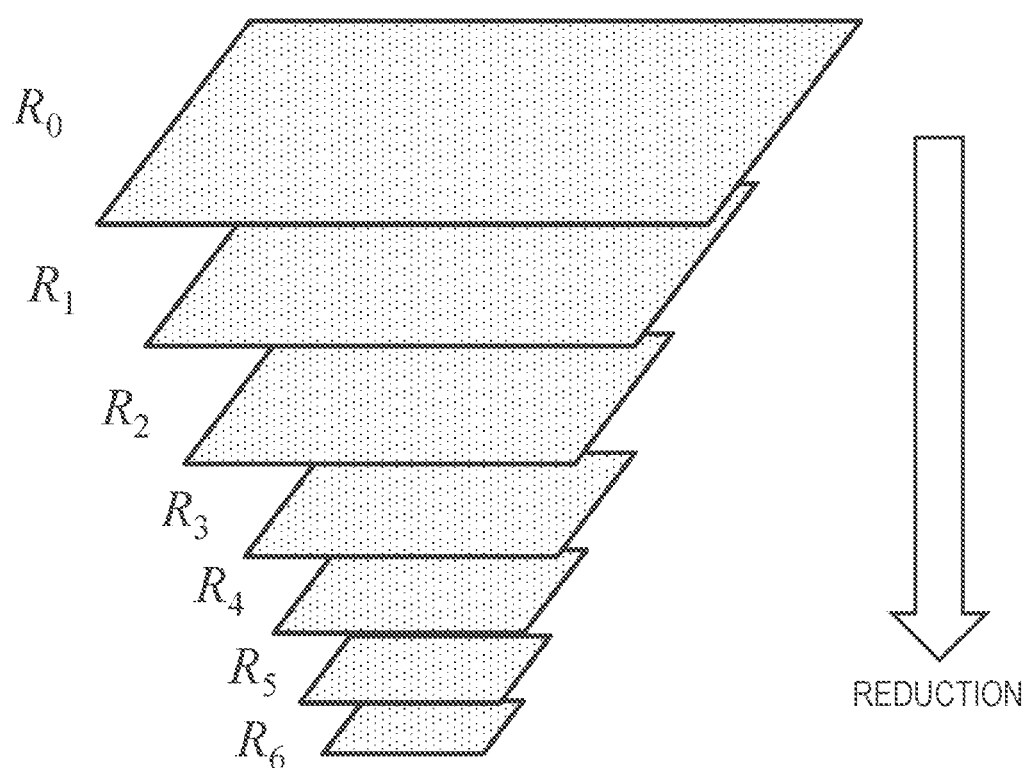
FIG. 13 is a diagram for describing a person detection process example to which a divisional small region setting window is applied.

For example, as illustrated in FIG. 13, an image $R_0$ is assumed to an image size of an original image which has not undergone the reduction process.

The processes of steps S201 to S205 of the flowchart illustrated in FIG. 8 are first executed using the original image $R_0$. In other words, the moving body pixel counting process based on the divisional small region setting window is executed using the original image $R_0$.

If the process for the original image $R_0$ is completed, in step S208, the image reduction process for the original image $R_0$ is executed. For example, a reduced image $R_1$ whose vertical and horizontal lengths are set to ½ is generated.

The processes of steps S201 to S205 of the flowchart illustrated in FIG. 8 are repeatedly executed using the reduced image $R_1$.

Thereafter, similarly, reduced images $R_2$ to $R_6$ are sequentially generated, and the processes of steps S201 to S205 of the flowchart illustrated in FIG. 8 are repeatedly executed using the reduced images $R_2$ to $R_6$.

Further, in the repetitive process, the size of the divisional/reduced region setting window is not reduced, and its original size is kept.

The reason for repeatedly executing the process using a plurality of reduced images as described above will be described with reference to FIG. 14.

FIG. 14 illustrates an active pixel counting process example in units of small regions using the divisional/reduced region setting window of the same size using the image $R_0$ of the original size and the reduced image $R_5$.

As the image is reduced, the image in the moving body detection frame is reduced as well.

A size of a person photographed in the image increases as it is closer to the camera and decreases as it is farther from the camera.

In other words, the size of the person photographed in the image has various sizes.

If the person detection to which the divisional small region setting windows 151 described with reference to FIGS. 9A, 9B, 10A, 10B, and 11 are applied is performed on persons of various sizes, a person region having a size adapted to the window size can be detected, but a person whose size is not adapted is unable to be detected.

In order to prevent a detection error caused by such size incompatibility, a plurality of reduced images are generated, and the person detection process is performed by applying the window of the same size.

As described above, it is possible to detect person regions of various sizes by repeatedly executing the person detection process by applying a plurality of reduced images.

The reduced image generation process in steps S207 and S208 of the flowchart illustrated in FIG. 8 is a process for enabling persons of various sizes included in the image frame to be detected as described above.

For example, as illustrated in FIGS. 13 to 14, images of a plurality of different reduction rates from an images $R_0$ to an image $R_6$ are generated, and the processes of step S201 and subsequent steps are repeated using a plurality of images.

In a case in which it is determined that the process using all the specified reduced images is completed in in step S207 of the flowchart illustrated in FIG. 8, the process ends.

In step S205 executed in accordance with the flowchart illustrated in FIG. 8, a list of first person candidate points determined to be a person is generated.

A specific example of the first person candidate point list will be described with reference to FIGS. 15 and 16.

FIG. 15 illustrates an example of the first person candidate point list.

Five entries, that is, identifiers 0 to 4 are registered in the first person candidate point list illustrated in FIG. 15.

The five pieces of registration data (entries) are registration data corresponding to the "first person candidate point" set for the moving body determined as a person obtained by executing the flow illustrated in FIG. 8.

Specifically, for example, it is registration data (entry) corresponding to each first person candidate point 161 illustrated in FIG. 12.

Further, one "first person candidate point" is detected corresponding to one setting position of the divisional small region setting window, and the "first person candidate point" is also set in a plurality of windows adjacent to one window in which the "first person candidate point" is set.

Both of them may be determined to be detection points corresponding to one person detected from the image, and the "first person candidate point" at the proximity positions may be merged into one piece of data and registered in a list.

Further, as a merging technique for merging a plurality of points at adjacent coordinate positions into one point, a merging technique known from the past is applied.

Specifically, for example, a plurality of first person candidate points in adjacent regions are searched using a "Mean Shift technique," and then a process of merging the first person candidate points whose Euclidean distance is equal to or less than a specified threshold value, that is, a merging process of aggregating a plurality of points into one representative point is executed by applying a "Nearest Neighbor technique."

A setting of registering information of only the representative point obtained as a result of merging may be performed in the list.

An example of the "the first person candidate point list" illustrated in FIG. 15 is an example in which the following data associated with first person candidate point identifier (ID) is recorded as registration data:

(1) x, y coordinates; and
(2) a width and a height of the window

Such data is recorded as the image of the original size which has not undergone the reduction process, that is, coordinates in the original image $R_0$ illustrated in FIGS. 13 and 14 and the window size.

Further, in the example illustrated in FIG. 15, the window size is 40×40 (pixels). This is the window size in the original image $R_0$.

In person candidate point identifiers 0, 2, and 3 illustrated in FIG. 15, a width and height of the window in the registration data are 40×40, and all entries thereof are determined to be the "first person candidate point" detected using the original image $R_0$.

On the other hand, in a person point identifier 1 illustrated in FIG. 15, a width and height of the window in the registration data are 80×80, and entries thereof are determined to be the "first person candidate point" detected using the original image $R_1$ obtained by setting the original image $R_0$ to ½ in both the vertical and horizontal directions.

In addition, in a person candidate point identifier 4 illustrated in FIG. 15, a width and height of the window in the registration data are 160×160, and entries thereof are determined to be the "first person candidate point" detected using the original image $R_2$ obtained by setting the original image $R_0$ to ¼ in both the vertical and horizontal directions.

As described above, both the setting coordinate position of the person candidate point and the size of the window used when the "first person candidate point" is sued are registered in the first person candidate point list as converted values corresponding to the non-reduced original image $R_0$.

FIG. 16 illustrates another example of the "the first person candidate point list" having a data setting different from that of the example illustrated in FIG. 15.

Five entries, that is, identifiers 0 to 4 are also registered in the first person candidate point list illustrated in FIG. 16.

The five pieces of registration data (entries) are registration data corresponding to the "first person candidate point" set for the moving body determined as a person obtained by executing the flow illustrated in FIG. 8.

Specifically, for example, it is registration data (entry) corresponding to each first person candidate point 161 illustrated in FIG. 12.

In the example illustrated in FIG. 16, the following data associated with the first person candidate point identifier (ID) is recorded in each piece of registration data:

(1) x, y coordinates; and
(2) detected hierarchical images ($R_0$ to $R_6$)

The x, y coordinates are recorded as coordinates in the image of the original size which has not undergone the reduction process, that is, coordinates in the original image $R_0$ illustrated in FIGS. 13 and 14.

In the example illustrated in FIG. 16, a setting of registering a hierarchical image in which the first person candidate point is detected, that is, first person candidate point detection hierarchical image information indicating whether or not the first person candidate point is detected in the images $R_0$ to $R_6$ illustrated in FIGS. 13 and 14 instead of the window size registered in the list illustrated in FIG. 15 is performed.

All the person candidate point identifiers 0, 2, and 3 illustrated in FIG. 16 are recorded as the "first person candidate point" detected using the original image $R_0$.

On the other hand, the person candidate point identifier 1 illustrated in FIG. 16 is recorded as the "first person candidate point" detected using the reduced image $R_1$.

Further, a person candidate point identifier 4 illustrated in FIG. 16 is recorded as the "first person candidate point" detected using a reduced image $R_2$.

As described above, the first person candidate point list illustrated in FIG. 16 is an example in which the setting coordinate position of the person candidate point and the identification information of the image used when the "first person candidate point" is detected are registered.

Further, in addition to the first person candidate point list described with reference to FIGS. 15 and 16, a list in which various registration information is set can be used.

Here, the coordinate information indicating the setting position of the "first person candidate point" is indispensable, and data from which the coordinate position in the non-reduced original image can be calculated is necessary.

[5. Details of Second Person Detection Process Executed by Image Processing Apparatus]

Next, the "second person detection process" in step S103 described above with reference to the flowchart of FIG. 6 will be described in detail with reference to FIG. 17 and subsequent drawings.

The "second person detection process" in step S103 in the flow of FIG. 6 includes the feature quantity calculation and the dictionary collation process in which only the pixel corresponding to the "first person candidate point" detected in step S102 and the neighbor pixel region thereof are set as the processing target as described above.

Figure 17:
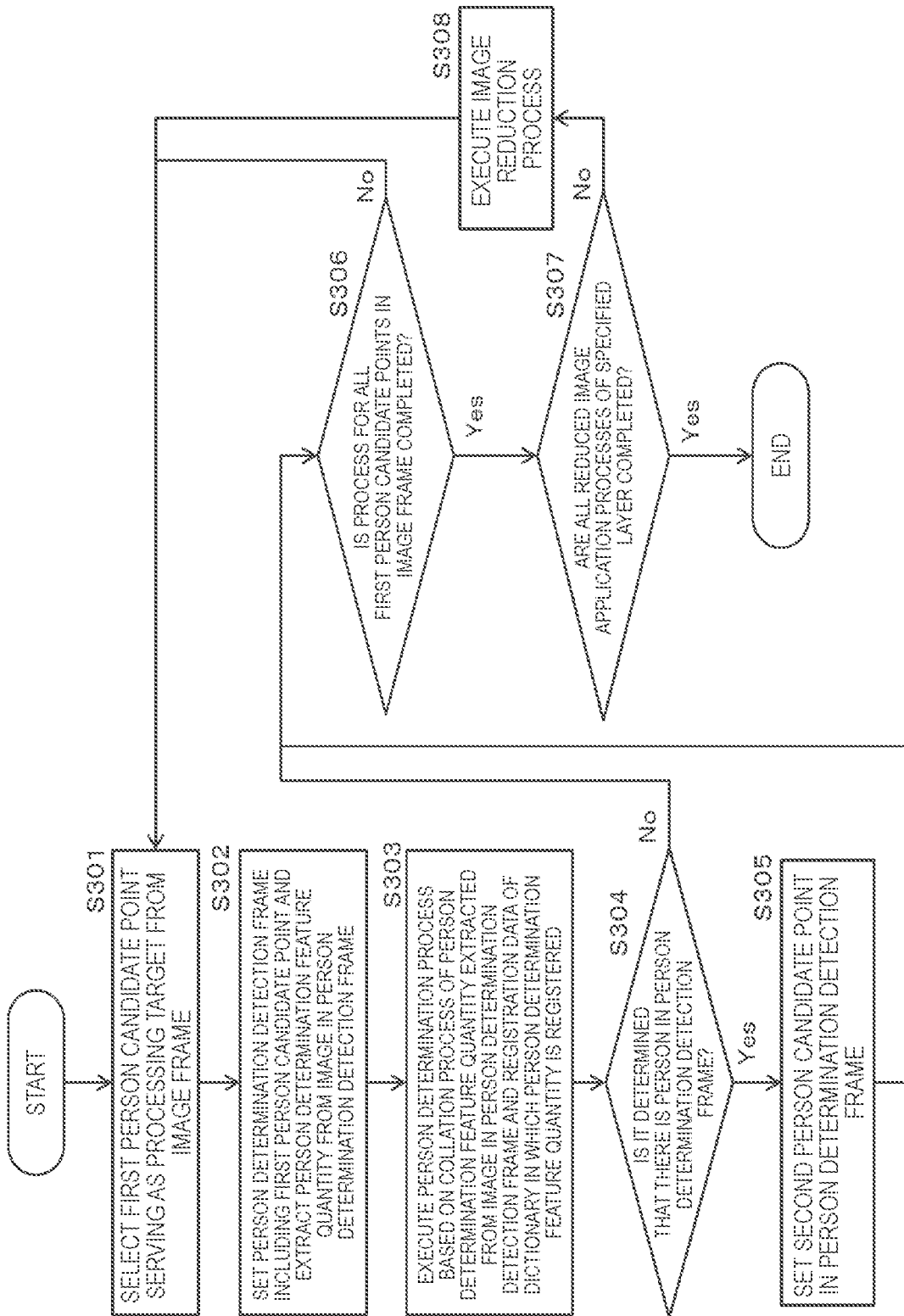
FIG. 17 is a flowchart for describing a processing sequence of a process executed by an image processing apparatus.

FIG. 17 is a flowchart for describing a detailed sequence of the "second person detection process" in step S103 described above with reference to the flowchart of FIG. 6.

Process of respective steps of the flow illustrated in FIG. 17 will be sequentially described below.

(Step S301)

First, in step S301, the image processing apparatus (camera) selects the first person candidate point serving as the processing target from the captured image frame.

The first person candidate point is registered in the first person candidate point list described above with reference to FIGS. 15 and 16 and stored in the memory.

In step S301, the image processing apparatus (camera) selects one piece of registration data (entry) registered in the first person candidate point list and sets the selected registration data (entry) as the processing target. Further, the coordinate position of the first person candidate point serving as the processing target is decided from the image frame on the basis of the coordinate data registered in the list.

(Step S302)

Then, in step S302, a person determination detection frame including the "first person candidate point" set as the processing target is set, and a person determination feature quantity is extracted from an image in the frame of the set person detection frame.

A setting example of the person determination detection frame including the "first person candidate point" will be described with reference to FIG. 18 and subsequent drawings.

Figure 18:
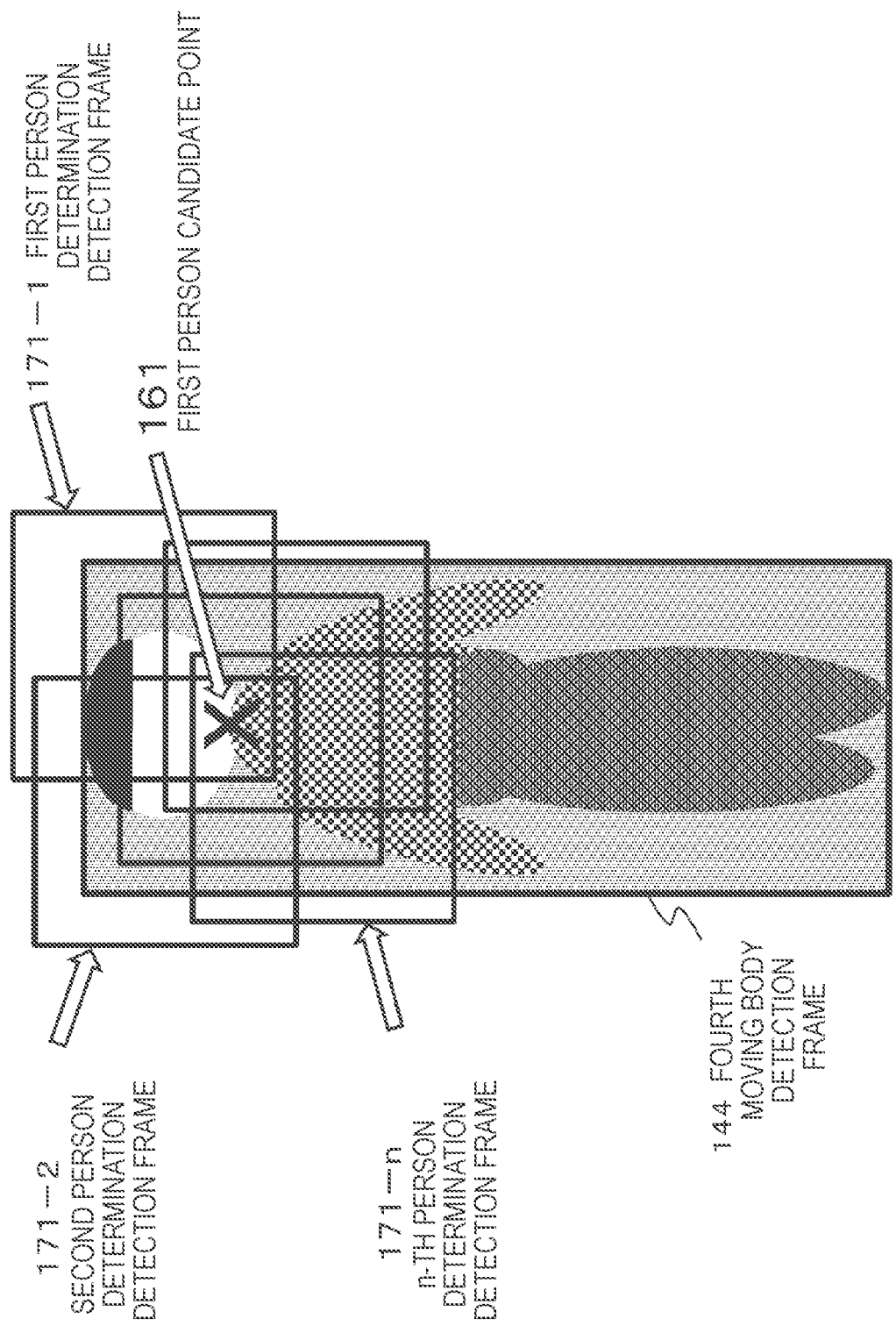
FIG. 18 is a diagram for describing a person determination process example to which a person determination detection frame is applied.

FIG. 18 illustrates the fourth moving body detection frame 144 including the first person candidate point 161 detected in accordance with the flow illustrated in FIG. 8 described above.

The first person candidate point 161 is set to the position of the coordinate position (x, y) registered in the first person candidate point list.

One or more person determination detection frames are set as a frame having a predetermined area including the first person candidate point 161 or neighbor pixels thereof, and a feature quantity extraction process is performed on each set frame.

In the example illustrated in FIG. 18, n person determination detection frames 171-1 to 171-$n$ including the first person candidate point 161 are illustrated.

A specific setting example of a plurality of person determination detection frames including the first person candidate point or neighbor pixels thereof will be described with reference to FIG. 19.

Figure 19:
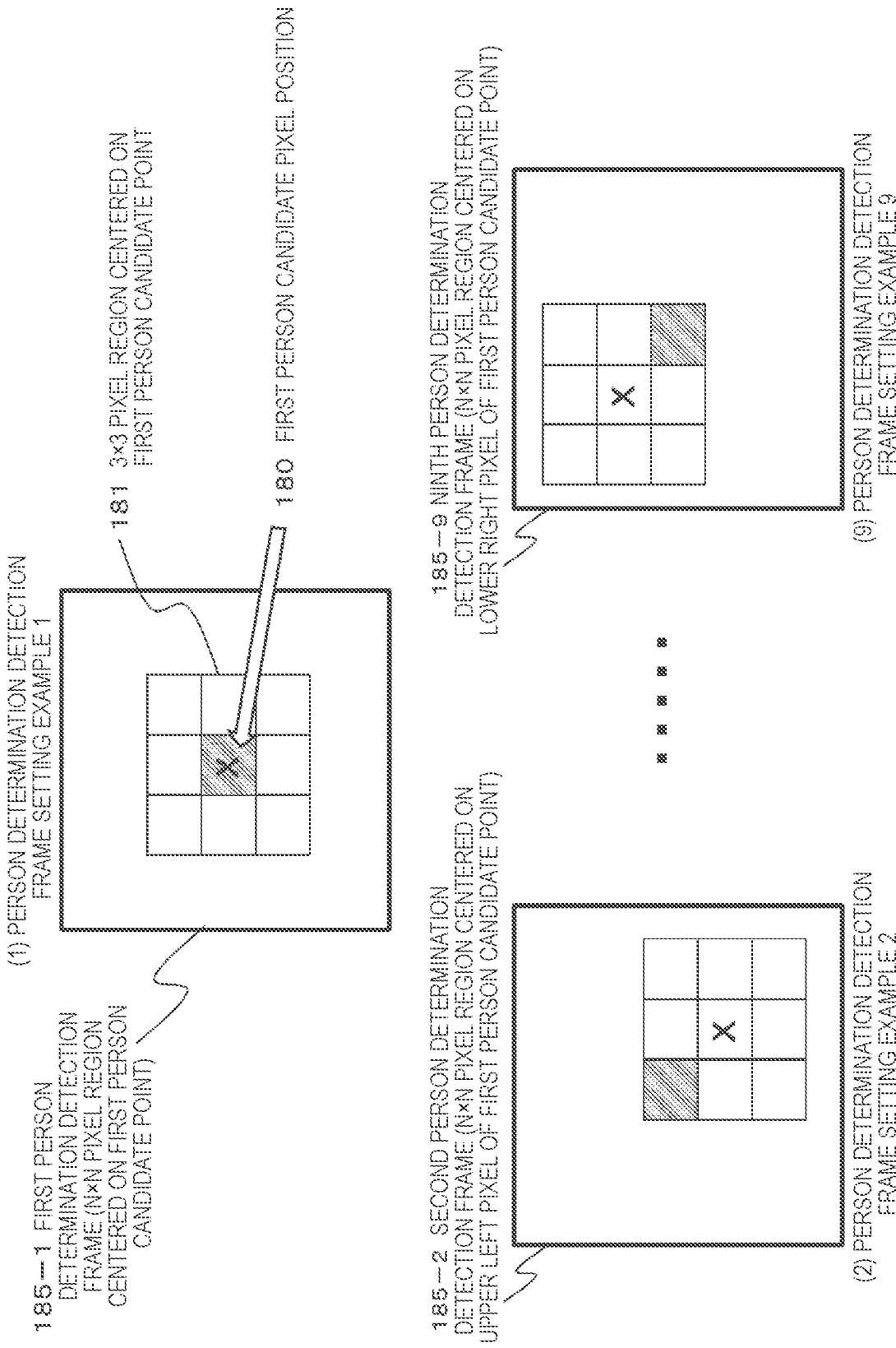
FIG. 19 is a diagram for describing a person determination process example to which a person determination detection frame is applied.

FIG. 19 is a diagram for describing a specific setting example of nine person determination detection frames including the first person candidate point or neighbor pixels thereof.

In the example of FIG. 19, nine N×N images centered on nine pixels constituting a 3×3 pixel region 181 centered on a first person candidate point 180 are set, and the person determination detection frames 185-1 to 185-9 are set as feature quantity extraction regions, respectively.

A person determination detection frame setting example 1 illustrated in FIG. 19(1) illustrates a person determination detection frame 185-1 including the N×N pixel region centered on a center pixel among nine pixels constituting the 3×3 pixel region 181 centered on the first person candidate point 180.

A person determination detection frame setting example 2 illustrated in FIG. 19(2) illustrates a person determination detection frame 185-2 including the N×N pixel region centered on an upper left pixel among the nine pixels constituting the 3×3 pixel region 181 centered on the first person candidate point 180.

A person determination detection frame setting example 2 illustrated in FIG. 19(9) illustrates a person determination detection frame 185-9 including the N×N pixel region centered on a lower right pixel among the nine pixels constituting the 3×3 pixel region 181 centered on the first person candidate point 180.

In FIG. 19, the person determination detection frames 185-1, 185-2, and 185-9 of the N×N pixels centered on three pixels among the nine pixels constituting the 3×3 pixel region 181 centered on the first person candidate point 180 are illustrated using these pixels, but in addition to them, the person determination detection frames 185-1 to 185-9 of the N×N pixels centered on each of the nine pixels constituting the 3×3 pixel region 181 are sequentially set, and the person determination feature quantity is extracted from each of the nine person determination detection frames 185-1 to 185-9.

Figure 20:
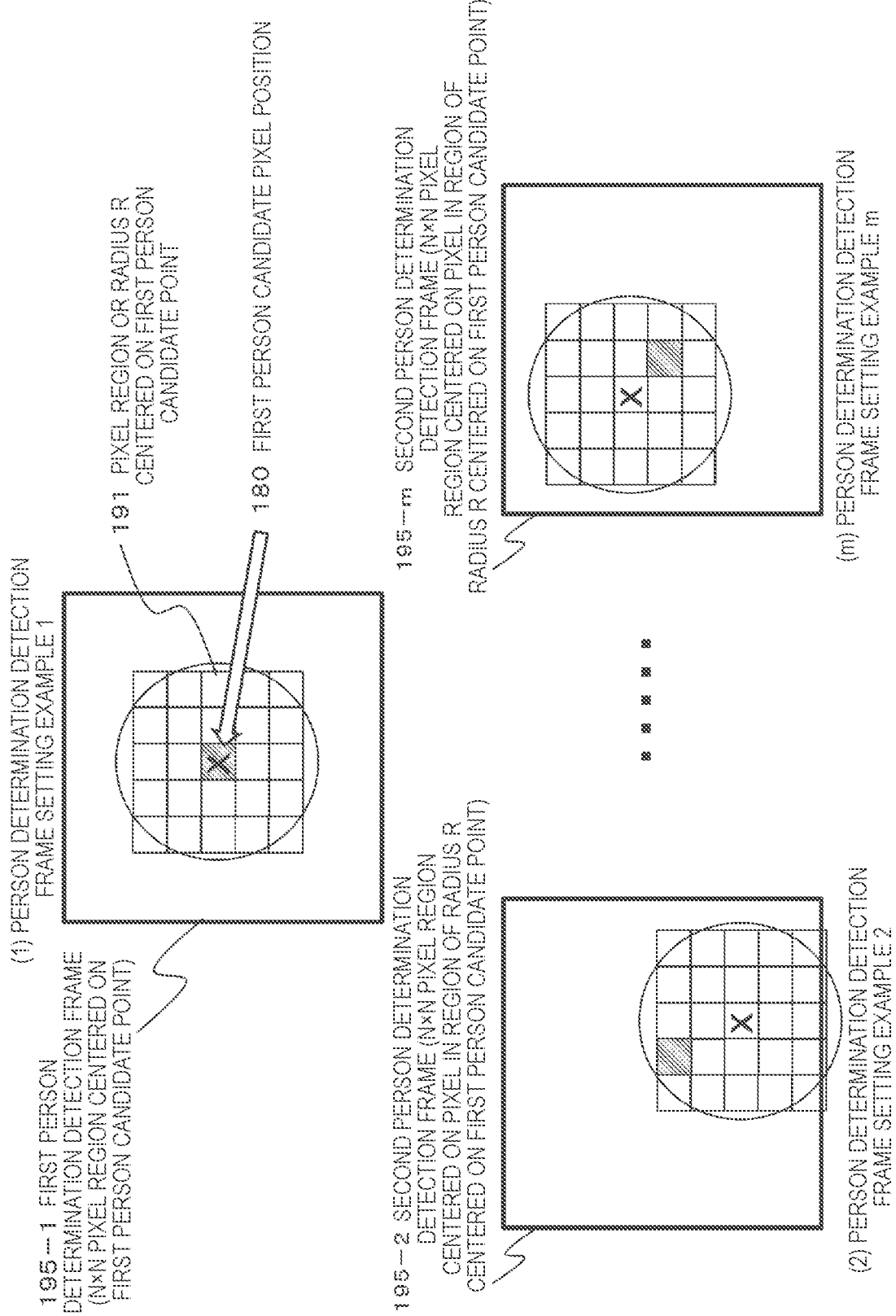
FIG. 20 is a diagram for describing a person determination process example to which a person determination detection frame is applied.

FIG. 20 is a diagram illustrating a setting example of person determination detection frames 195-1 to 195-$m$ different from the setting example of the person determination detection frame described with reference to FIG. 19.

The setting example of the person determination detection frame illustrated in FIG. 20 is an example in which a region of a predetermined range centered on the first person candidate point 180, for example, a pixel region 191 with a radius R is set, m pixels are selected from the pixel region, M pixel regions of N×N centered on each of the selected m pixels are set as the person determination detection frames 195-1 to 191-$m$.

The feature quantity extraction for the person determination is extracted from each of the m person determination detection frames 195-1 to 195-$m$.

In step S302 of the flow of FIG. 17, as described with reference to FIGS. 19 and 20, for example, the person determination detection frame including the first person candidate point is set, and the person determination feature quantity is extracted from the setting detection frame.

Further, the feature quantity is, for example, an image feature quantity of an eye, a nose, a mouth, r the like indicating a feature of a human face or a feature quantity indicating a human body shape, and various existing feature quantities applied to the person detection process from the image can be used.

Further, the feature quantity extracted from the image is compared with a dictionary registration feature quantity registered in the memory which is the storage unit of the image processing apparatus, and if a degree of approximation is determined to be high, it is determined to be a person.
(Steps S303 and S304)

Then, in steps S303 and S304, the person determination process based on the collation process for the person determination feature quantity extracted from the image in the person determination detection frame and the registration data of the dictionary in which the person determination feature quantity is registered is executed.

The comparison collation process for the feature quantity extracted on the basis of the pixel value in the person determination detection frame described with reference to FIGS. 18 to 20 and the dictionary registration feature quantity registered in the memory which is the storage unit of the image processing apparatus is executed, and in a case in which it is determined that the extracted feature quantity coincides with the dictionary registration feature quantity or a degree of similarity thereof is high, the image captured in the person detection frame is determined to be a person.

In this case, step S304 is determined to be Yes, and the process proceeds to step S305.

On the other hand, in a case in which it is determined that the extracted feature quantity does not coincide with the dictionary registration feature quantity or a degree of similarity is low, the image captured in the person detection frame is determined not to be a person.

In this case, step S304 is determined to be No, and the process proceeds to step S306.
(Step S305)

A process of step S305 is a process executed in a case in which the moving body in the person determination detection frame is determined to be a person in the determination process of step S303.

In this case, in step S305, the second person candidate point is set in the person determination detection frame, and the coordinate information or the like is recorded in the second person candidate point list.

This process will be described with reference to FIG. 21.

Figure 21:
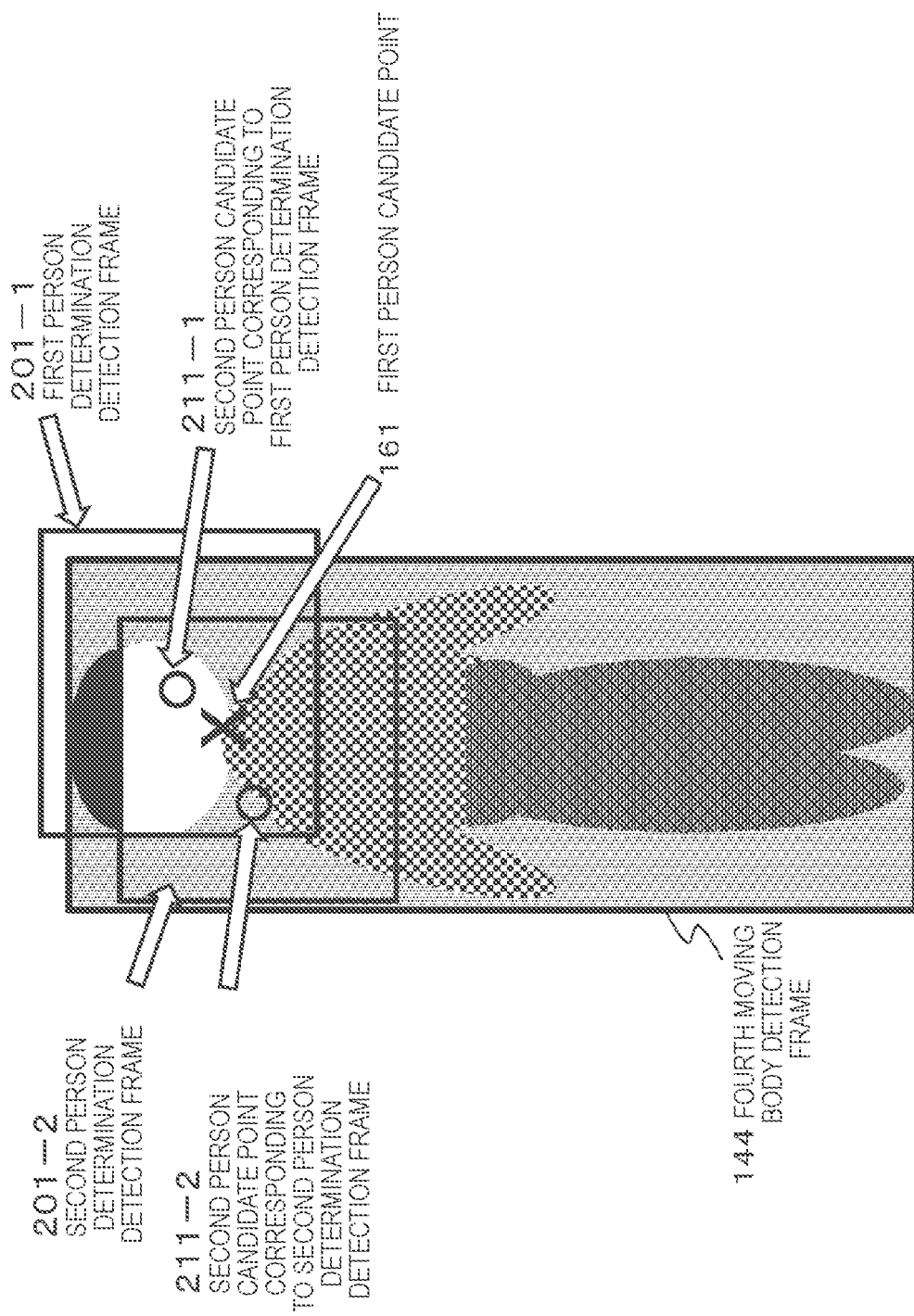
FIG. 21 is a diagram for describing a person determination process example to which a person determination detection frame is applied.

FIG. 21 illustrate the fourth moving body detection frame 144, the first person candidate point 161 set in the fourth moving body detection frame 144, a plurality of person determination detection frames 201-1 and 201-2 including the first person candidate point 161, and second person candidate points 211-1 and 211-2 set to the person determination detection frames 201-1 and 201-2, similarly to those described with reference to FIG. 18.

Further, one "second person candidate point" is set corresponding to one person determination detection frame. For example, the "second person candidate point" is set at the center position of the person determination detection frame.

As described with reference to FIG. 18 to FIG. 20, the process of setting a plurality of person determination detection frames for one the "first person candidate point," executing feature quantity extraction and dictionary collation from each frame, and setting the "second person candidate point" corresponding to the frame, and thus there are cases in which a plurality of the "second person candidate points" corresponding to the number of set person decision detection frames are set.

A plurality of "second person candidate points" at the proximity positions are determined to be detection points corresponding to one person detected from the image, and a setting of merging the "second person candidate points" at the proximity positions into one piece of data and registering them in the list may be performed.

Specific examples of the process of merging the "second person candidate points" and the second person candidate point list will be described later.
(Step S306)

In a case in which the setting of the "second person candidate point" and the list registration process are completed step S305, in or in a case in which the moving body in the person determination detection frame is determined not to be a person in step S304, the process proceeds to step S306.

In step S306, it is determined whether or not all the processes for all the first person candidate points in the image frame serving as the processing target are completed.

In a case in which the processes are completed, the process proceeds to step S307.

In a case in which the processes are not completed, the process returns to step S301, and the process for the unprocessed first person candidate point is executed.
(Steps S307 and S308)

In a case in which it is determined in step S306 that all the processes for all the "first person candidate point" in the image frame serving as the processing target are completed, in step S307, it is determined whether or not all the reduced image application processes of the specified layer are completed.

In a case in which it is determined that all the reduced image application processes of the specified layer are completed, the process ends.

In a case in which it is determined that any one of the reduced image application processes of the specified layer is not completed, the process proceeds to step S308, the image reduction process is executed, the process returns to step S301, and the processes of step S301 and subsequent steps to which the reduced image is applied are executed.

The process example of steps S307 and S308 will be described with reference to FIG. 22.

The image reduction process executed in steps S307 and S308 is a process similar to the processes of steps S207 and S208 described above with reference to FIG. 8.

In other words, it is a process for executing the feature quantity extraction and the dictionary collation process using the person determination detection frames in steps S302 to S303 by using reduced image.

Figure 22:
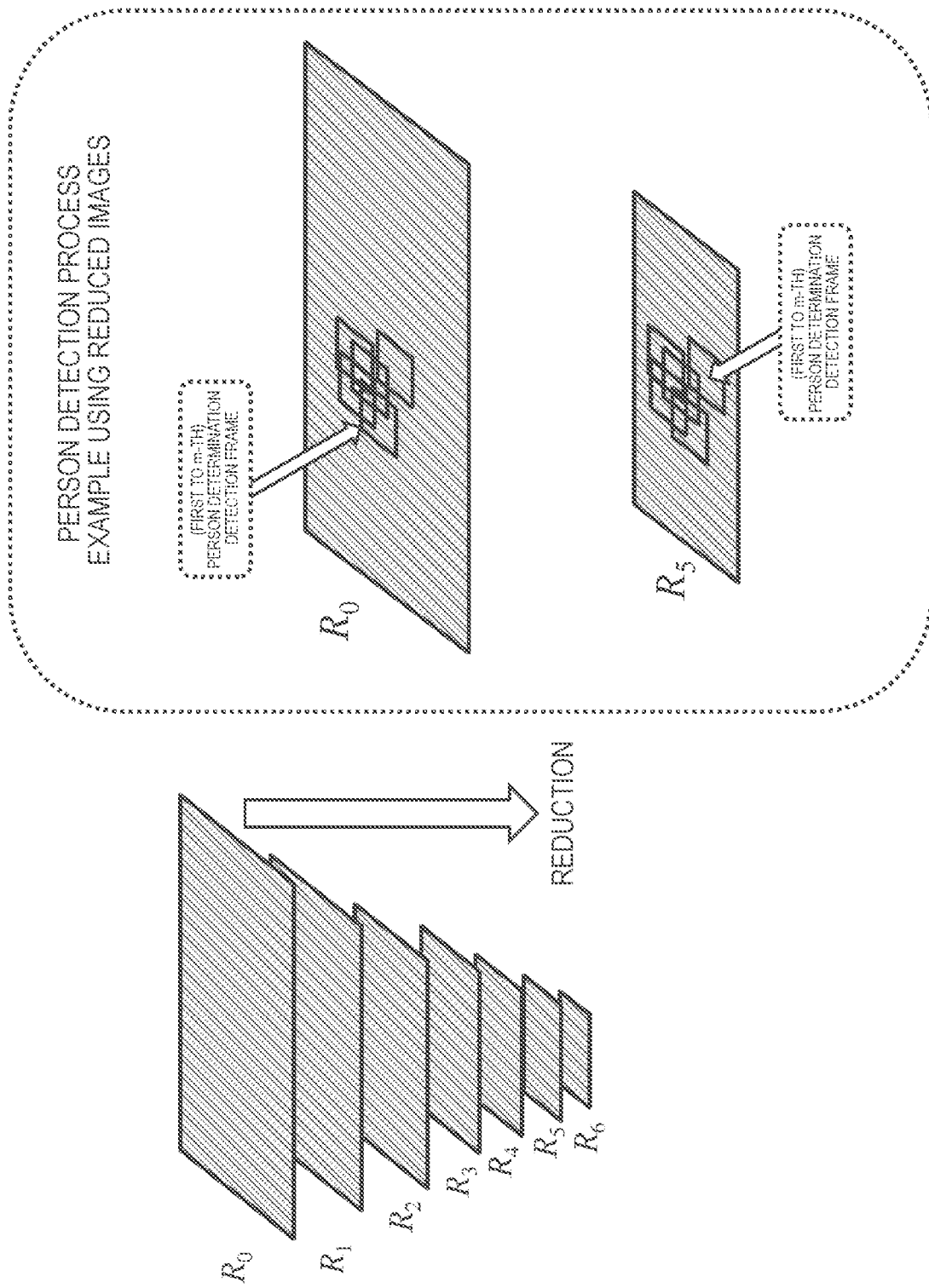
FIG. 22 is a diagram for describing a person determination process example to which a person determination detection frame is applied.

For example, as illustrated in FIG. 22, an image $R_0$ is assumed to have the image size of the original image.

Processes of steps S301 to S305 of the flowchart illustrated in FIG. 17 are executed using the original image $R_0$. In other words, the feature quantity extraction and the dictionary collation process using the person determination detection frame are executed using the non-reduced original image $R_0$.

If the process for the original image $R_0$ is completed, in step S308, the image reduction process for the original image $R_0$ is executed. For example, a reduced image $R_1$ whose vertical and horizontal lengths are set to ½ is generated.

The processes of steps S301 to S305 of the flowchart illustrated in FIG. 17 are repeatedly executed using the reduced image $R_1$.

Thereafter, similarly, reduced images $R_2$ to $R_6$ are sequentially generated, and the processes of steps S301 to S305 of the flowchart illustrated in FIG. 17 are repeatedly executed using the reduced images $R_2$ to $R_6$.

Further, in the repetitive process, the size of the person determination detection frame is not reduced, and its original size is kept.

As described above, the reason for repeatedly executing the process using a plurality of reduced images is to perform the person detection process adapted to the size of the person photographed in the image.

As described above, the size of a person in the image increases as it is closer to the camera and decreases as it is farther from the camera.

If the feature quantity extraction using the person determination detection frame is performed for persons of various sizes, a person region having a size adapted to the person determination detection frame size can be detected, but a person whose size is not adapted is unable to be detected.

In order to prevent a detection error caused by such size incompatibility, a plurality of reduced images are generated, and the person detection process is performed by applying the person determination detection frame of the same size.

As described above, it is possible to detect person image regions of various sizes by repeatedly executing the person detection process by applying a plurality of reduced images.

The reduced image generation process in steps S307 and S308 in the flowchart illustrated in FIG. 17 is a process for enabling persons of various sizes included in the image frame to be detected as described above.

For example, as illustrated in FIG. 22, a plurality of reduced images from an images $R_0$ to an image $R_6$ are generated, and the processes of step S301 and subsequent steps are repeated using a plurality of reduced images.

In a case in which it is determined that the process using all the specified reduced images is completed in in step S307 of the flowchart illustrated in FIG. 17, the process ends.

In step S305 executed in accordance with the flowchart illustrated in FIG. 17, a list of "second person candidate points" determined to be a person is generated.

A specific example of the second person candidate point list will be described with reference to FIG. 23.

FIG. 23 illustrates an example of the second person candidate point list.

Five entries, that is, identifiers 0 to 4 are registered in the second person candidate point list illustrated in FIG. 23.

The five pieces of registration data (entries) are registration data corresponding to the "second person candidate point" set for the moving body determined as a person obtained by executing the flow illustrated in FIG. 17.

Further, as described above, there are cases in which one "second person candidate point" is set corresponding to one person determination detection frame, and a plurality of adjacent "second person candidate points" are set for a plurality of adjacent person determination detection frames.

A plurality of "second person candidate points" at the proximity positions are determined to be detection points corresponding to one person detected from the image, and a setting of merging the "second person candidate points" at the proximity positions into one piece of data and registering them in the list may be performed.

As a merging technique for merging a plurality of points at close coordinate positions into one point, a merging technique known from the past is applied. The applied merging technique is similar to the merging technique described above.

For example, a plurality of "second person candidate points" in adjacent regions are searched using a "Mean Shift technique," and then a process of merging the "second person candidate points" whose Euclidean distance is equal to or less than a specified threshold value, that is, a merging process of aggregating a plurality of points into one representative point is executed by applying a "Nearest Neighbor technique."

Figure 24:
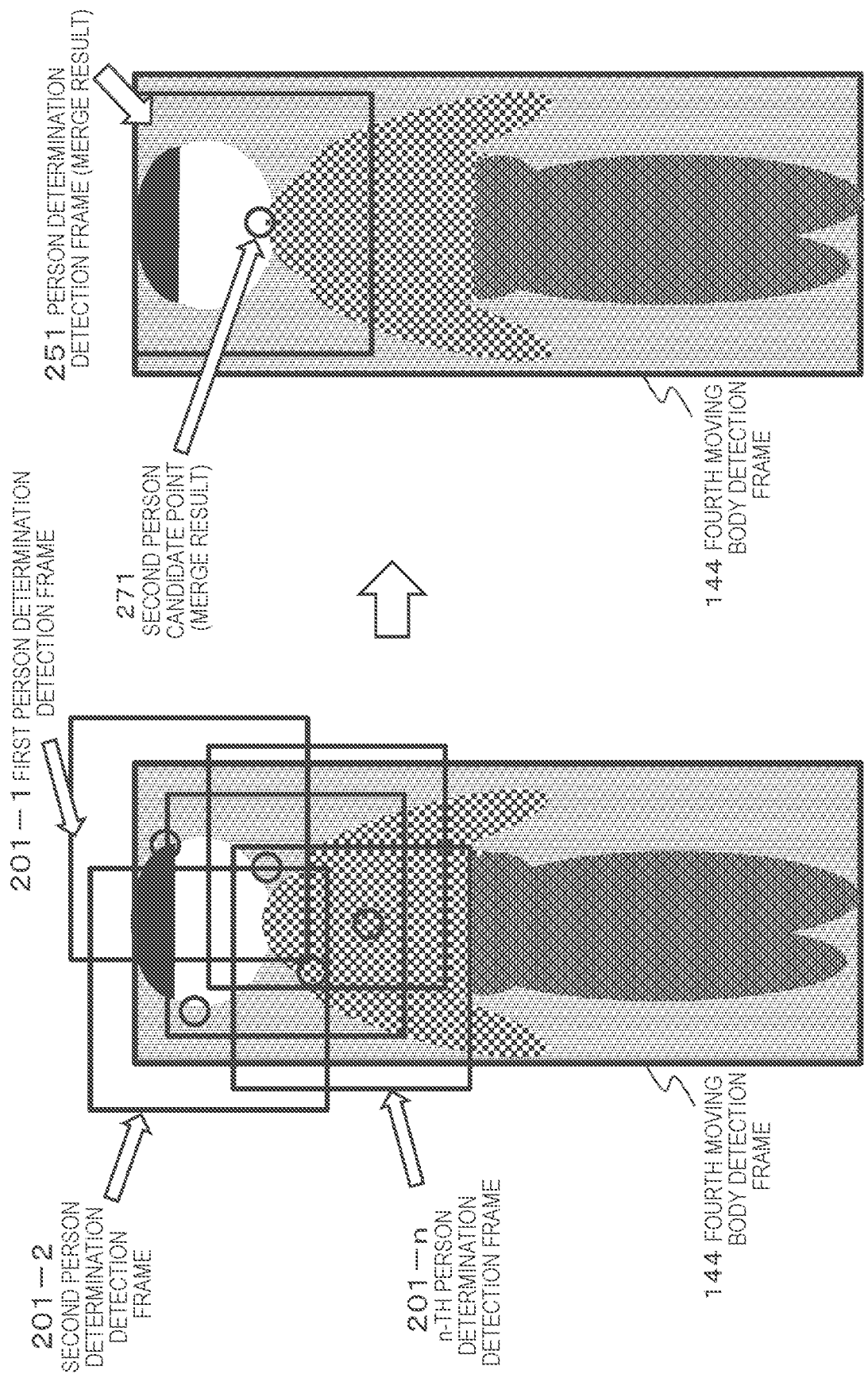
FIG. 24 is a diagram for describing a merging process example of a person determination detection frame and a second person candidate point.

FIG. 24 is a diagram illustrating a process example in which a plurality of person determination detection frames 201-1 to 201-$n$ and the "second person candidate points" set corresponding to a plurality of frames are aggregated into one person determination detection frame 251 and one second person candidate point 271.

For example, only a merge result obtained by the merging process is registered in the second person candidate point list illustrated in FIG. 23.

In the example illustrated in FIG. 23, the following data associated with the second person candidate point identifier (ID) is recorded in each piece of registration data:

(1) x, y coordinates; and
(2) detected hierarchical images ($R_0$ to $R_6$)

The x, y coordinates are recorded as coordinates in the image of the original size which has not undergone the reduction process, that is, coordinates in the original image $R_0$ illustrated in FIG. 22.

Further, a setting of registering a hierarchical image in which the "second person candidate point" is detected, that is, second person candidate point detection hierarchical image information indicating whether or not the "second person candidate point" is detected in the images $R_0$ to $R_6$ illustrated in FIG. 22 is performed.

All the person candidate point identifiers 0, 2, and 3 illustrated in FIG. 23 are recorded as the "second person candidate point" detected using the original image $R_0$.

On the other hand, the person candidate point identifier 1 illustrated in FIG. 23 is recorded as the "second person candidate point" detected using the reduced image $R_1$.

Further, a person candidate point identifier 4 illustrated in FIG. 23 is recorded as the "second person candidate point" detected using a reduced image $R_2$.

As described above, the second person candidate point list illustrated in FIG. 23 is an example in which the setting coordinate position of the person candidate point and the identification information of the image used when the "second person candidate point" is detected are registered.

Further, in addition to the second person candidate point list described with reference to FIG. 23, a list in which various registration information is set can be used.

Here, the coordinate information indicating the setting position of the "second person candidate point" is indispensable, and data from which the coordinate position in the non-reduced original image can be calculated is necessary.

[6. Details of Final Verification Process and Metadata Generation Process Executed by Image Processing Apparatus]

Next, the "final verification process and the metadata generation process" of step S104 described above with reference to the flowchart of FIG. 6 will be described in detail with reference to FIG. 25 and subsequent drawings.

As described above, the "final verification process and the metadata generation process" of step S104 in the flow of FIG. 6 include a process of re-verifying whether or not the moving body in which the "second person candidate point" obtained as a result of the second person detection process in step S103 is set actually a person, and, for example, a verification process using previous and next captured image frames is performed.

An installation state of a monitoring camera is not necessarily a condition suitable for person detection. For example, it may be an environment in which a shape of a person is unable to be photographed clearly in dark places or places in which sunshine or the weather changes. Further, an obstacle may appear between a person and a camera, or an occlusion region which is unable to be photographed by a camera occurs. There occur many situations in which it is difficult to identify a person such as an angle of depression of a camera, a photographed direction of a person, or the like.

Due to the external factors, an erroneously detected point which is not actually a person may be included in the second person candidate point obtained as a result of the second person detection process in step S103, and a point which should be originally detected as the second person candidate point may be undetected.

In this regard, in step S104, the re-verification for the detection point or the like in step S103 is performed, and finally a process of finally determining whether or not the object in the moving body detection frame is a person is performed.

Data of a person or a non-human object is recorded in the metadata, that is, the metadata described above with reference to FIG. 2 as the object type on the basis of the result obtained as a result of final determination.

The "final verification process and the metadata generation process" of step S104 will be described in detail with reference to FIG. 25 and subsequent drawings.

Figure 25:
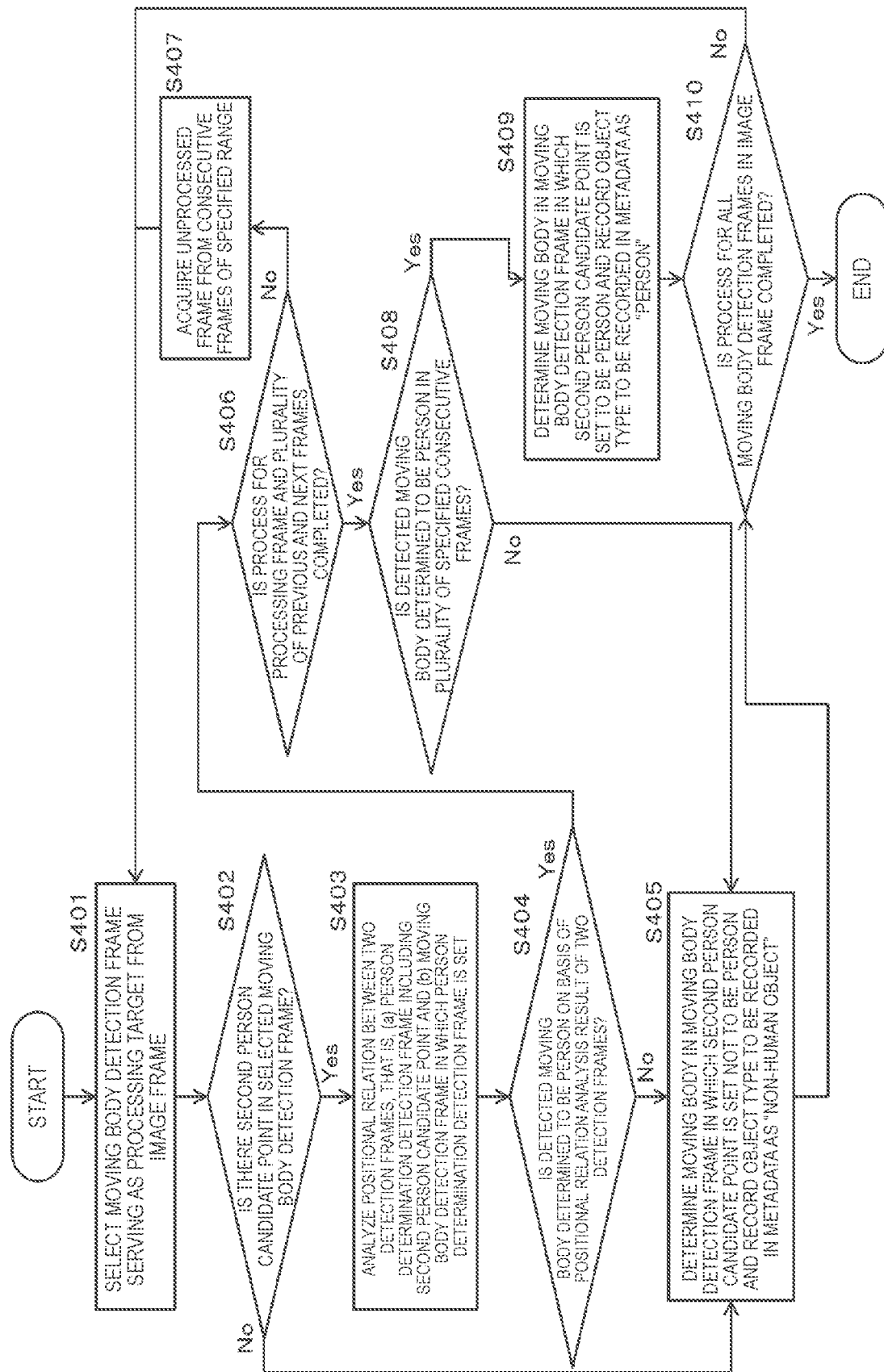
FIG. 25 is a flowchart for describing a processing sequence of a process executed by an image processing apparatus.

FIG. 25 is a flowchart illustrating a detailed sequence of the "final verification process and the metadata generation process" of step S104 described with reference to the flowchart of FIG. 6.

Process of respective steps of the flow illustrated in FIG. 25 will be sequentially described below.

(Step S401)

First, in step S401, the image processing apparatus (camera) selects the moving body detection frame serving as the processing target from the captured image frame.

The moving body detection frame is the moving body detection frame detected in step S101 of the flow illustrated in FIG. 6 described above.

In step S101 of the flow illustrated in FIG. 6, a plurality of moving body detection frames are set in the image, for example, as illustrated in FIG. 7.

In step S401, first, one moving body detection frame serving as the processing target is selected.

(Step S402)

Then, in step S402, it is determined whether or not the "second person candidate point" is set in the moving body detection frame selected in step S401.

The "second person candidate point" is the "second person candidate point" set in accordance with the flow described with reference to step S103 in FIG. 6, that is, the flow described with reference to FIG. 17.

The coordinate position of the "second person candidate point" is registered in the second person candidate point list described above with reference to FIG. 23 and stored in the memory.

In step S402, the image processing apparatus (camera) checks whether or not the registration data (entry) having the coordinate position information corresponding to the coordinate position in the moving body detection frame selected in step S401 is registered in the second person candidate point list.

In a case in which it is registered in the second person candidate point list, it is determined that the "second person candidate point" is present in the moving body detection frame set as the processing target, and the process proceeds to step S403.

On the other hand, in a case in which it is not registered in the second person candidate point list, it is determined that the "second person candidate point" is not present in the moving body detection frame set as the processing target, and the process proceeds to step S405.

(Steps S403 and S404)

In a case in which it is determined in step S402 that the "second person candidate point" is present in the moving body detection frame, in steps S403 and S404, the re-verification process of whether or not the moving body in the moving body detection frame is really a person is performed.

More specifically, in step S403, the following process is executed.

A positional relation of following two detection frames (a) and (b) is analyzed:

(a) the person determination detection frame including the second person candidate point; and (b) the moving body detection frame in which the person determination detection frame is set.

In step S404, it is again determined whether or not the moving body in the moving body detection frame in which the second person candidate point is set is a person on the basis of the analysis result, that is, the positional relation analysis result of the two detection frames.

The processes of steps S403 and S404 are mainly executed as a process of removing an erroneously detected point at which the "second person candidate point" is erroneously detected, that is, a moving body which is not a person is determined to be the "second person candidate point."

A specific example of this erroneous detection removal process will be described with reference to FIG. 26 and subsequent drawings.

Figure 26:
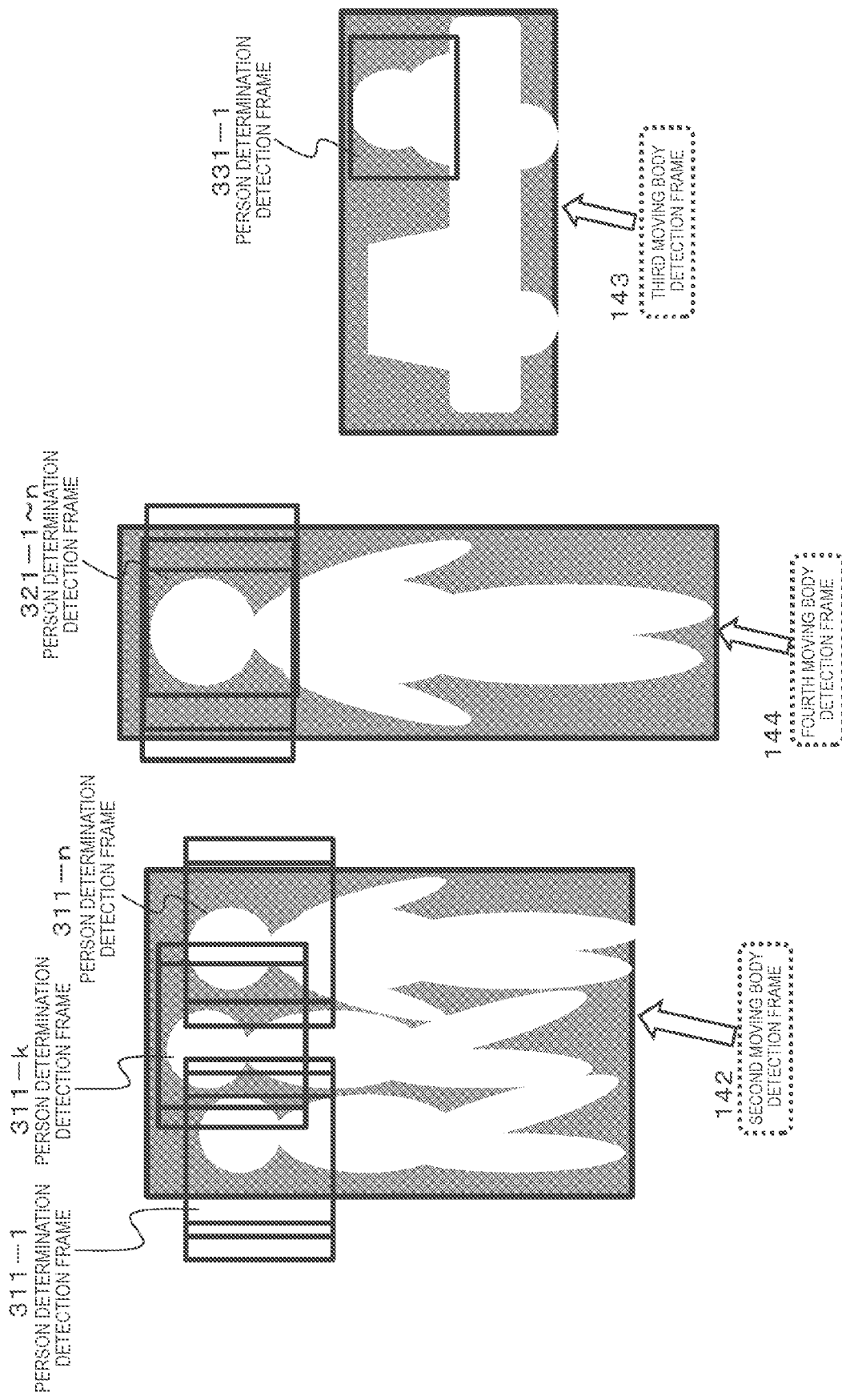
FIG. 26 is a diagram for describing an example of a final verification process of person determination performed by an image processing apparatus.

FIG. 26 illustrates an example of a plurality of moving body detection frames in which the determination detection frame in which the "second person candidate point" is detected is set.

The person determination detection frame is a frame set in the process of step S103 of the flow of FIG. 6, that is, in the second person detection process executed in accordance with the flow illustrated in FIG. 17. This is the person determination detection frame described with reference to FIGS. 18 to 20.

FIG. 26 illustrates the person determination detection frame in which the "second person candidate point" is detected in the second to fourth moving body detection frames 142 to 144 in the image described above with reference to FIG. 7.

Further, these person detection frames are the person determination detection frames before the merging process.

In the process according to the flow illustrated in FIG. 17, the person determination detection frame in which the "second person candidate point" is detected is likely to be set as a plurality of frames which are dense in the horizontal direction in a case in which the moving body is a person.

On the other hand, in a case in which the moving body is not a person, the person determination detection frame in which the "second person candidate point" is detected is not set as a plurality of frames which are dense in the horizontal direction but likely to be appear as a single frame or a small number of frames.

This is based on a phenomenon that, in a case in which the moving body is a person, the feature quantity indicating that it is a person is likely to be detected even at a position in which the frame is shifted in the horizontal direction, but in a case in which the moving body is not a person, the feature quantity indicating that it is a person is hardly detected at the position in which the frame is shifted in the horizontal direction.

Further, this phenomenon is similar regardless of whether or not there is one person in the moving body frame or there are a plurality of persons in the moving body frame.

The second moving body detection frame 142 and the fourth moving body detection frame 144 illustrated in FIG. 26 are examples in a case in which the moving body in the moving body detection frame is a person.

In the second moving body detection frame 142, moving body detection frames 311-1 to 311-$n$ in which the second person candidate point is set are densely set in the horizontal direction.

Similarly, in the fourth moving body detection frame 144, moving body detection frames 321-1 to 321-$n$ in which the second person candidate point is set are densely set in the horizontal direction.

On the other hand, the third moving body detection frame 143 illustrated in FIG. 26 is an example in a case in which the moving body in the moving body detection frame is not a person.

In the third moving body detection frame 143, only one moving body detection frame 331-1 in which the second person candidate point is set is set but not set densely in the horizontal direction.

As described above, there occurs a difference in that, in a case in which the moving body is a person, the moving body detection frame in which the "second person candidate point" is detected is set densely in the horizontal direction, and in a case in which the moving body is not a person, the moving body detection frame in which the "second person candidate point" is detected is not set densely in the horizontal direction.

The erroneous detection removal process in steps S303 and S304 is executed as the process of deleting the erroneously detected "second person candidate point" on the basis of the difference.

A lightweight arithmetic process for realizing the process of detecting and deleting the erroneous detection will be described with reference to FIG. 27.

Figure 27:
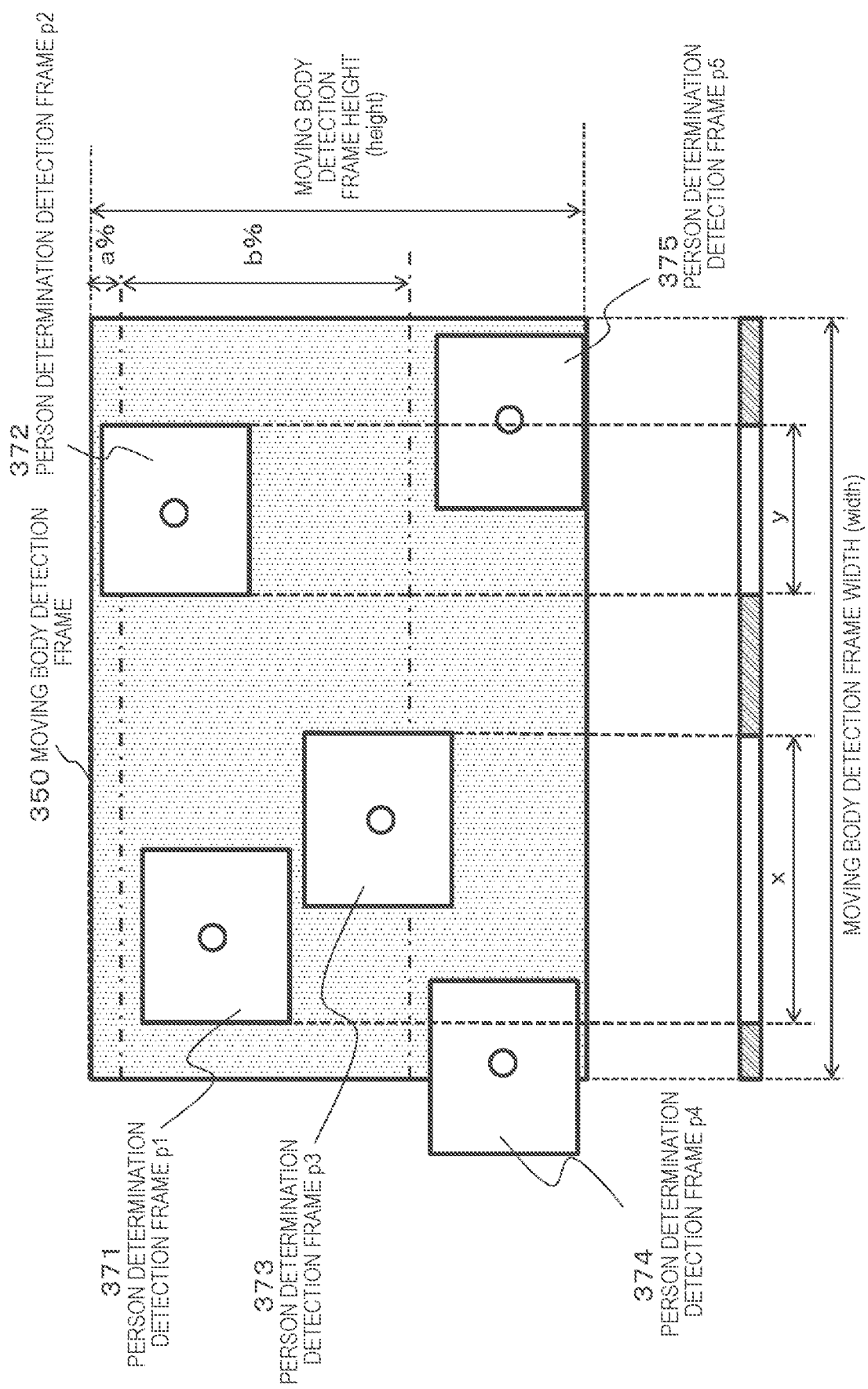
FIG. 27 is a diagram for describing an example of a final verification process of person determination performed by an image processing apparatus.

FIG. 27 illustrates a moving body detection frame 350 serving as the processing target, examples of a plurality of determination detection frames in which the "second person candidate point" is assumed to be detected, and a person determination detection frame p1 371 to a person determination detection frame p5 375.

The person determination detection frames 371 to 375 are frames set in the process of step S103 of the flow of FIG. 6, that is, in the second person detection process executed in accordance with the flow illustrated in FIG. 17. These are the person determination detection frames described with reference to FIGS. 18 to 20.

As illustrated in FIG. 27, it is inspected whether or not the person determination detection frame in which the second person candidate point is set is present in the horizontal direction in a range of a height of b % from a position a % lower than a height of the moving body detection frame from the upper end portion of the moving body detection frame 350.

For example, a %=3 to 10%, b %=5 to 60%, and these values are applied.

It is determined whether or not the person determination detection frames in which the second person candidate point is set are densely present in the upper region of about half of the moving body detection frame 350.

As a specific process, for example, as illustrated in a lower part of FIG. 27, a process of calculating a region (x+y) occupancy rate of the person determination detection frames present in the upper region (a % to b % from the upper end) with respect to the moving body detection frame horizontal width(width).

In the example illustrated in FIG. 27, the person determination detection frames present in the upper region (a % to b % from the upper end) include the person determination detection frame p1 371, the person determination detection frame p2 372, and the person determination detection frame p3 373.

A length of the image region including the person determination detection frame p1 371 and the person determination detection frame p3 373 in the horizontal direction, for example, the number of pixels is indicated by x.

Further, a length of the image region including the person determination detection frame p2 372 in the horizontal direction, for example, the number of pixels is indicated by y.

The length of the width of the moving body detection frame 350 in the horizontal direction, for example, the number of pixels is indicated by width.

In this setting, the region (x+y) occupancy rate of the person determination detection frames present in the upper region (a % to b % from the upper end) with respect to the moving body detection frame horizontal width (width) is calculated by the following formula (Formula 1).

$$\text{person determination detection frame occupancy rate} = (x+y)/(\text{width}) \quad \text{(Formula 1)}$$

Further, the person determination detection frame occupancy rate calculated in accordance with (Formula 1) is compared with a preset occupancy rate threshold value (Th 1=c %). As the threshold value c %, for example, a value such as 30% is used.

$$\text{person determination detection frame occupancy rate} \geq \text{Th1} \quad \text{(Formula 2)}$$

If the determination formula of (Formula 2) is held, the moving body in the person determination detection frame in which the second person candidate point is set is determined to be a person.

On the other hand, in a case in which the determination formula of (Formula 2) is not held, the moving body in the person determination detection frame in which the second person candidate point is set is determined not to be a person. In other words, the "second person candidate point" is determined to be the erroneous detection.

Further, the example illustrated in FIG. 27 is an example in which the region of the person determination detection frame to be determined as a person is limited to the height direction (b % from the height of a %) of the moving body detection frame.

It is because, as described above with reference to FIG. 18, in a case in which the person detection method of detecting the feature quantity indicating the upper body of the person is used, the person determination detection frame in which the second person candidate point is set is likely to appear at the upper part of the moving body detection frame, and the lower part is likely to be erroneous detection.

Therefore, the range and the threshold value for calculating the occupancy rate are changed depending on the use of other person detection techniques such as the feature quantity detection process for the entire person, the installation state of the camera (a case in which an angle of depression is given or the like), or the state of the person (a case in which there is a shadow, a case in which a person is riding a bicycle, or the like).

Specifically, for example, in a case in which there is a shadow or in a case in which a person is riding a bicycle, the moving body frame is likely to spread in the horizontal direction. In order to determine a person correctly, for example, in a case in which a shadow or a person riding a bicycle is detected, it is preferable to perform a process of lowering the threshold value c % to a relatively low value or an adjustment process of increasing the occupancy rate calculation range of the person determination detection frame.

Further, the line specifying the occupancy rate calculation range of the person determination detection frame can be variously set, for example, the horizontal direction or the oblique direction, and a shape and a size thereof may change depending on circumstances.

It returns to the description of the flowchart illustrated in FIG. 25.

In a case in which it is determined in step S402 that the "second person candidate point" is present in the moving body detection frame, in steps S403 and S404, the re-verification process of whether or not the moving body in the moving body detection frame is really a person is performed.

Specifically, as described with reference to FIGS. 26 and 27, in step S403, the following process is executed.

A positional relation of following two detection frames (a) and (b) is analyzed:

(a) the person determination detection frame including the second person candidate point; and (b) the moving body detection frame in which the person determination detection frame is set.

In step S404, it is again determined whether or not the moving body in the moving body detection frame in which the second person candidate point is set is a person on the basis of the analysis result, that is, the positional relation analysis result of the two detection frames.

As described above, the processes of steps S403 and S404 are mainly executed as a process of removing an erroneously detected point at which the "second person candidate point" is erroneously detected, that is, a moving body which is not a person is determined to be the "second person candidate point."

In a case in which it is determined in step S404 that the moving body in the moving body detection frame in which the second person candidate point is set is a person, the process proceeds to step S406.

On the other hand, in a case in which it is determined in step S404 that the moving body in the moving body detection frame in which the second person candidate point is set is not a person, the process proceeds to step S405.

(Step S405)

In a case in which it is determined in step S402 that there is no second person candidate point in the moving body detection frame or in a case in which it is determined in step S404 that the moving body in the moving body detection frame in which the second person candidate point is set is not a person, the process proceeds to step S405.

In step S405, the moving body of the moving body detection frame in which the second person candidate point is set is determined not to be a person, and it is recorded in the metadata.

In other words, the object type of the object of the moving body detection frame in which the second person candidate point is set is recorded in the metadata described above with reference to FIG. 2 as a "non-human object."

(Steps S406 to S408)

On the other hand, in a case in which it is determined in step S404 that the moving body in the moving body detection frame in which the "second person candidate point" is set is a person, the process proceeds to step S406.

In step S406, it is determined whether or not a process for a current processing frame and a plurality of previous and next frames specified in advance is completed.

In a case in which the process for the current processing frame and a plurality of previous and next frames specified in advance is not completed, in step S407, an unprocessed frame is acquired from consecutive frames in a range which is specified in advance, and the process of step S401 and subsequent steps is performed on the unprocessed frame.

In a case in which it is determined in step S406 that the process for the current process frame and a plurality of previous and next frames specified in advance is completed, the process proceeds to step S408.

In step S408, it is determined whether or not the moving body in which the "second person candidate point" is set is a person in a plurality of specified consecutive frames.

In a case in which it is determined that the moving body in which the "second person candidate point" is set is a person in a plurality of specified consecutive frames, the process proceeds to step S409.

On the other hand, in a case in which it is determined that the moving body in which the "second person candidate point" is set is not a person in a plurality of specified consecutive frames, the process proceeds to step S405.

The processes of steps S406 to S408 are applications of a common erroneous detection removal process known from the past. For example, in the consecutive frame, in a case in which it is determined that the same moving body object is all determined to be a person in common in the same moving body object, final determination indicating that the object is a person is performed.

On the other hand, in a case in which common determination indicating that the moving body in which the "second person candidate point" is set is a person in a plurality of specified consecutive frames is not obtained, final determination indicating that the set object of the "second person candidate point" is not a person is performed.

Further, in addition to these processes, in a case in which a size or a position of the moving body or a person frame, luminance or a color of an object, or a feature varies greatly, a process of regarding it as the erroneous detection may be performed.

In a case in which it is determined in the determination process of step S408 that the moving body in which the "second person candidate point" is set is not a person in a plurality of specified consecutive frames, the process proceeds to step S405.

In step S405, as described above, the moving body of the moving body detection frame in which the "second person candidate point" is set is determined not to be a person, and it is recorded in the metadata.

In other words, the object type of the object of the moving body detection frame in which the "second person candidate point" is set is recorded in the metadata described above with reference to FIG. 2 as a "non-human object."

(Step S409)

On the other hand, in a case in which it is determined in the determination process of step S408 that the moving body in which the second person candidate point is set is a person in a plurality of specified consecutive frames, the process proceeds to step S409.

In step S409, the moving body of the moving body detection frame in which the "second person candidate point" is set is determined to be a person, and it recorded in the metadata.

In other words, the object type of the object of the moving body detection frame in which the "second person candidate point" is set is recorded in the metadata described above with reference to FIG. 2 as a "person."

(Step S410)

After step S405 or the metadata recording process of step S409, the process proceeds to step S410.

In step S410, it is determined whether or not the process for all the moving body detection frames in the image frame is completed.

In a case in which there is an unprocessed moving body detection frame, the process starting from step S401 is repeatedly performed on the unprocessed moving body detection frame.

In a case in which the process for all the moving body detection frames is completed, the process ends.

With these processes, a result of whether or not each moving body detected from the image frame is a person is obtained, and the metadata corresponding to the result, that is, the metadata in which the object information described with reference to FIG. 2 is recorded is generated and transmitted from the image processing apparatus (camera) to the server or the information terminal.

[7. Other Embodiments]

In the flowchart illustrated in FIG. 25 described above, the process of steps S406 to S408 is the erroneous detection removal process and has been described as the process of performing the final determination indicating that the object is a person in a case in which the same moving body object is all determined to be a person in common in the consecutive frames in a predetermined range.

In the above embodiment, in a case in which all are determined to be a person in the predetermined consecutive frames, determination indicating that it is finally a person is performed, but for example, final determination of whether or not it is a person may be performed in accordance with a frequency that it is determined to be a person in consecutive frames in a predetermined period.

For example, if the same person is detected in m frames or more among n frames, it is determined to be a person (n≥m). Accordingly, even though the second person candidate point is intermittently detected in a time direction, non-detection is compensated.

On the other hand, in a case in which the detection frequency is low, there is a high possibility of the erroneous detection, and final determination indicating that it is not a person is performed.

The parameters n and m may be arbitrarily determined or may be set automatically.

For example, in order to increase detection sensitivity in a dark place in which it is difficult to detect a person, when a luminance level of a video is low, n is increased, and m is decreased. Here, a target whose frequency is measured over frames can be each second person candidate point or each person determination detection frame or may be object data (each moving body detection frame).

In the former case, the second person candidate point is tracked in an arbitrary manner over frames. For example, elements of the second person candidate point present in a certain range between frames are regarded to be identical.

Further, in the latter case, it is possible to associate objects between frames by confirming an ID of the object data. It is understood whether or not it is detected as a person in each frame by seeing whether or not it is recorded as a person in a type of object data.

Further, in the process of the present disclosure, the "first person candidate point" detected in the "first person detection process" of step S102 of FIG. 6 may be densely detected in a certain image region.

It is preferable that these points be configured such that candidate points are thinned out or candidate points are merged on the basis of a rule specified in advance as described above. It is possible to further reduce the processing load after the "second person detection process" by reducing the number of "first person candidate points." It is preferable to perform similar thinning and merging on the "second person candidate point."

As described above, in the process of the present disclosure, in step S102 of the flow illustrated in FIG. 6, the "first person detection process" executable as the lightweight calculation process is executed to detect the "first person candidate point," and the dictionary-based "second person detection process" requiring the computation of step S103 is executed only on the neighbor region of the "first person candidate point" detected in step S102, so that the total computation can be drastically reduced.

Since these processes can be realized with the computation of the level at which they can be installed in the camera, it is possible to distributedly process the person detection process through the respective cameras and reduce the load concentrated on the server. In other words, it is possible to reduce an installation cost of a large-scale system, and it is also possible to investigate, for example, an object of a criminal or the like serving as a tracking target in a short time.

Further, since the "second person detection process" is performed in step S103 only for the range estimated to be a person through the "first person detection process" in step S102 of the flow of FIG. 6, the possibility of the erroneous detection in the "second person detection process" can be greatly reduced.

Further, since the final verification process such as the deletion of the erroneous detection data or the like is performed in step S104 after the "second person detection process," the stable detection process is realized even in situations in which the performance of the "second person detection process" is hardly obtained.

[8. Summary of Configuration Present Disclosure]

The foregoing thus provides a detailed explanation of embodiments of the present disclosure with reference to specific embodiments. However, it is obvious that persons skilled in the art may make modifications and substitutions to these embodiments without departing from the gist of the present disclosure. In other words, the present disclosure has been disclosed by way of example, and should not be interpreted in a limited manner. The gist of the present disclosure should be determined in consideration of the claims.

Additionally, the present technology may also be configured as below.

(1)

An image processing apparatus, including:

a data processing unit configured to execute a person detection process from an image, in which the data processing unit executes a pre-determination process of setting a person determination detection frame in a moving body detection frame surrounding a moving body region detected from the image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result.

(2)

The image processing apparatus according to (1), in which the data processing unit in the final determination process, calculates an occupancy rate in a specific region in the moving body detection frame of the person determination detection frame determined to include a person in the pre-determination process, and finally determines that the image in the person determination detection frame is a person in a case in which the occupancy rate is equal to or greater than a threshold value.

(3)

The image processing apparatus according to (1) or (2), in which the data processing unit in the pre-determination process, calculates an image feature quantity in the person determination detection frame and determines whether or not the image in the person determination detection frame is a person on the basis of the calculated image feature quantity.

(4)

The image processing apparatus according to any of (1) to (3), in which the data processing unit in the pre-determination process, calculates an image feature quantity in the person determination detection frame and determines whether or not the calculated feature quantity has a feature quantity corresponding to an upper body of a person, and in the final determination process, calculates an occupancy rate in an approximately upper half region in the moving body detection frame of the person determination detection frame determined to include the upper body of the person in the pre-determination process, and finally determines that the image in the person determination detection frame is a person in a case in which the occupancy rate is equal to or greater than a threshold value.

(5)

The image processing apparatus according to any of (1) to (4), in which the data processing unit in the pre-determination process, calculates an image feature quantity in the person determination detection frame, executes a dictionary collation process which is a collation process of the calculated feature quantity and a pre-registered person determination feature quantity, and determines whether or not the image in the person determination detection frame is a person on the basis of a collation result.

(6)

The image processing apparatus according to any of (1) to (5), in which the data processing unit executes the final determination process on a plurality of n consecutive image frames, and in a case in which a final decision result indicating that the image is determined to be a person in m or more image frames specified in advance is obtained (here, n≥m), determines that the image in the person determination detection frame is a person.

(7)

The image processing apparatus according to any of (1) to (6), in which the data processing unit generates metadata in which object type information indicating whether or not a moving body obtained as a result of the final determination process is a person is recorded.

(8)

The image processing apparatus according to (7), in which the image processing apparatus transmits the metadata generated by the data processing unit through a communication unit.

(9)

The image processing apparatus according to any of (1) to (8), in which the data processing unit executes as the pre-process, a first person detection process of setting a divisional small region setting window, determining whether or not the image in the window is a person on the basis of the number of moving body pixels of each divisional small region, and setting a first person candidate point in the window in a case in which the image is determined to be a person, and a second person detection process of setting a person determination detection frame including the first person candidate point or a first person candidate point neighbor pixel, determining whether or not an image in the person determination detection frame is a person on the basis of an image feature quantity in the person determination detection frame, and setting a second person candidate point in the person determination detection frame in a case in which the image is determined to be a person, and in the final determination process, analyzes a distribution state in a moving body detection frame of the person determination detection frame in which the second person candidate point is set and finally determines whether or not the image in the person determination detection frame is a person on the basis of an analysis result.

(10)

The image processing apparatus according to (9), in which, in the first person detection process, the data processing unit compares a proportion of the number of moving body pixels to the number of all pixels of each divisional small region with a threshold value specified in advance, and determines whether or not the image in the window is a person on the basis of a comparison result.

(11)

An image processing system, including:

a camera that captures an image; and a server connected with the camera via a network, in which the camera includes a data processing unit configured to execute a person detection process from the captured image, and the data processing unit executes a pre-determination process of setting a person determination detection frame in a moving body detection frame surrounding a moving body region detected from the captured image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result, and generates metadata in which object type information indicating whether or not a moving body obtained as a result of the final determination process is a person is recorded and transmits the metadata to the server.

(12)

An image processing system, including:

a camera that captures an image; and a server and an information terminal connected with the camera via a network, in which the camera includes a data processing unit configured to execute a person detection process from the captured image, the data processing unit executes a pre-determination process of setting a person determination detection frame in a moving body detection frame surrounding a moving body region detected from the captured image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result, and generates metadata in which object type information indicating whether or not a moving body obtained as a result of the final determination process is a person is recorded and transmits the metadata to the server together with the captured image, and the server stores the captured image and the metadata received from the camera in a storage unit, and executes an object search or tracking process to which the captured image and the metadata stored in the storage unit are applied in response to a processing request from the information terminal.

(13)

An image processing method executed in an image processing apparatus, in which the image processing apparatus includes a data processing unit configured to execute a person detection process from an image, and the data processing unit executes a pre-determination process of setting a person determination detection frame in a moving body detection frame surrounding a moving body region detected from the image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result.

(14)

A program causing an image processing apparatus to execute image processing, in which the image processing apparatus includes a data processing unit configured to execute a person detection process from an image, and the program causes the data processing unit to execute a pre-determination process of setting a person determination detection frame in a moving body detection frame surrounding a moving body region detected from the image and determining whether or not an image in the person determination detection frame is a person, and a final determination process of analyzing a distribution state in a moving body detection frame of the person determination detection frame determined to include a person in the pre-determination process and finally determining whether or not the image in the person determination detection frame is a person on the basis of an analysis result.

In addition, the series of processes described in this specification can be executed by hardware, software, or a combination configuration of the hardware and the software. In a case in which a process is executed by software, a program that records a process sequence can be installed in a memory of a computer embedded in dedicated hardware to be executed or a program can be installed in a general-purpose computer capable of executing various processes to be executed. For example, the program can be recorded in advance on a recording medium. In addition to the installation on a computer from a recording medium, the program can also be received via a network such as a Local Area Network (LAN) or the Internet and can be installed on a recording medium such as a built-in hard disk.

Also, various processes described in this specification may be executed chronologically as described above and may also be executed in parallel or individually according to a processing capability of a device executing the processes or as necessary. Note that in this specification, the term "system" refers to a logical aggregate configuration of multiple devices, and the respective devices of the configuration are not limited to being inside the same housing.

INDUSTRIAL APPLICABILITY

As described above, according to a configuration of one embodiment of the present disclosure, an apparatus and a method for executing a person detection process from an image through a lightweight calculation with a high degree of accuracy are realized.

Specifically, a pre-determination process of setting a person determination detection frame in a moving body detection frame surrounding a moving body region detected from the image and determining whether or not an image in the person determination detection frame is a person and a final determination process of analyzing a distribution state in a moving body detection frame of the person determination detection frame determined to include a person in the pre-determination process and finally determining whether or not the image in the person determination detection frame is a person on the basis of an analysis result are executed. For example, in the final determination process, an occupancy rate in a specific region in the moving body detection frame of the person determination detection frame determined to include a person in the pre-determination process is calculated, and the image in the person determination detection frame is finally determined to be a person in a case in which the occupancy rate is equal to or greater than a threshold value.

With this configuration, an apparatus and a method for executing a person detection process from an image through a lightweight calculation with a high degree of accuracy are realized.

REFERENCE SIGNS LIST 10 camera
20 server
30 information terminal
40 network
100 image processing apparatus (camera)
101 lens
102 image sensor
103 image processing unit
104 sensor
105 memory
106 communication unit
107 drive unit
108 CPU
109 GPU
110 DSP
141 to 144 moving body detection frame
151 divisional small region setting window
161 first person candidate point
171 person determination detection frame
201 person determination detection frame
211 second person candidate point
251 person determination detection frame
271 second person candidate point
350 moving body detection frame
371 to 375 person determination detection frame

The invention claimed is:

1. An image processing apparatus, comprising:
a processor configured to execute a person detection process from an image,
wherein the processor is further configured to:
execute a pre-determination process to:
set a person determination detection frame in a moving body detection frame surrounding a moving body region detected from the image; and
determine whether an image in the person determination detection frame is a person; and
execute a final determination process to:
analyze a distribution state in the moving body detection frame of the person determination detection frame determined to include the person in the pre-determination process; and
determine whether the image in the person determination detection frame is the person based on the analysis.

2. The image processing apparatus according to claim 1, wherein the processor, in the final determination process, is further configured to:
calculate an occupancy rate in a specific region in the moving body detection frame of the person determination detection frame determined to include the person in the pre-determination process; and
determine that the image in the person determination detection frame is the person based on the occupancy rate that is one of equal to or greater than a threshold value.

3. The image processing apparatus according to claim 1, wherein the processor, in the pre-determination process, is further configured to:
calculate an image feature quantity in the person determination detection frame; and
determine whether the image in the person determination detection frame is the person based on the calculated image feature quantity.

4. The image processing apparatus according to claim 1, wherein the processor is further configured to:
in the pre-determination process:
calculate an image feature quantity in the person determination detection frame; and
determine whether the calculated image feature quantity has a feature quantity corresponding to an upper body of the person, and in the final determination process:
calculate an occupancy rate in an upper half region in the moving body detection frame of the person determination detection frame determined to include the upper body of the person in the pre-determination process; and
determine that the image in the person determination detection frame is the person based on the occupancy rate that is one of equal to or greater than a threshold value.

5. The image processing apparatus according to claim 1, wherein the processor, in the pre-determination process, is further configured to:
calculate an image feature quantity in the person determination detection frame;
execute a dictionary collation process which is a collation process of the calculated image feature quantity and a pre-registered person determination feature quantity; and
determine whether the image in the person determination detection frame is the person based on a collation result.

6. The image processing apparatus according to claim 1, wherein the processor is further configured to:
execute the final determination process on a plurality of n consecutive image frames; and
based on a final decision result indicating that the image in the person determination detection frame is determined to be the person in m or more image frames specified in advance determine that the image in the person determination detection frame is the person, wherein n≥m.

7. The image processing apparatus according to claim 1, wherein the processor is further configured to generate metadata in which object type information indicating whether a moving body obtained as a result of the final determination process is the person is recorded.

8. The image processing apparatus according to claim 7, wherein the processor is further configured to transmit the generated metadata through a communication unit.

9. The image processing apparatus according to claim 1, wherein
the processor is further configured to execute, as the pre-determination process, a first person detection process and a second person detection process, wherein
in the first person detection process, the processor is further configured to:
set a divisional small region setting window,
determine whether an image in the divisional small region setting window is the person based on a number of moving body pixels of each divisional small region, and
set a first person candidate point in the divisional small region setting window based on the image in the divisional small region setting window determined to be the person, and
in the second person detection process, the processor is further configured to:
set the person determination detection frame including the first person candidate point or a first person candidate point neighbor pixel, determine whether the image in the person determination detection frame is the person based on an image feature quantity in the person determination detection frame, and set a second person candidate point in the person determination detection frame based on the image in the person determination detection frame determined to be the person; and in the final determination process, the processor is further configured to:

analyze a distribution state in the moving body detection frame of the person determination detection frame in which the second person candidate point is set; and determine whether the image in the person determination detection frame is the person based on the analysis of the distribution state in the moving body detection frame of the person determination detection frame in which the second person candidate point is set.

10. The image processing apparatus according to claim 9, wherein, in the first person detection process, the processor is further configured to:

compare a proportion of the number of moving body pixels to a number of all pixels of each divisional small region with a threshold value specified in advance, and determine whether the image in the divisional small region setting window is the person based on the comparison.

11. An image processing system, comprising:
a camera configured to capture an image; and
a server connected with the camera via a network, wherein
the camera includes a processor configured to execute a person detection process from the captured image, and
the processor is further configured to:
execute a pre-determination process to:
set a person determination detection frame in a moving body detection frame surrounding a moving body region detected from the captured image; and
determine whether an image in the person determination detection frame is a person;
execute a final determination process to:
analyze a distribution state in the moving body detection frame of the person determination detection frame determined to include the person in the pre-determination process; and
determine whether the image in the person determination detection frame is the person based on the analysis;
generate metadata in which object type information indicating whether a moving body obtained as a result of the final determination process is the person is recorded; and
control transmission of the metadata to the server.

12. An image processing system, comprising:
a camera configured to capture an image; and
a server and an information terminal connected with the camera via a network, wherein
the camera includes a processor configured to execute a person detection process from the captured image, the processor is further configured to:
execute a pre-determination process to:
set a person determination detection frame in a moving body detection frame surrounding a moving body region detected from the captured image; and
determine whether an image in the person determination detection frame is a person;
execute a final determination process to:
analyze a distribution state in the moving body detection frame of the person determination detection frame determined to include the person in the pre-determination process; and
determine whether the image in the person determination detection frame is the person based on the analysis;
generate metadata in which object type information indicating whether a moving body obtained as a result of the final determination process is the person is recorded; and
transmits control transmission of the metadata to the server together with the captured image, and
the server is configured to:
store the captured image and the metadata received from the camera in a storage unit; and
execute an object search or tracking process to which the captured image and the metadata stored in the storage unit are applied based on a processing request from the information terminal.

13. An image processing method, comprising:
in an image processing apparatus that, includes a processor:
executing a person detection process from an image;
executing a pre-determination process of setting a person determination detection frame in a moving body detection frame surrounding a moving body region detected from the image;
determining whether an image in the person determination detection frame is a person;
executing a final determination process of analyzing a distribution state in the moving body detection frame of the person determination detection frame determined to include the person in the pre-determination process; and
determining whether the image in the person determination detection frame is the person based on the analysis.

14. A non-transitory computer-readable medium having stored thereon computer-executable instructions which, when executed by a computer, cause the computer to execute operations, the operations comprising:
executing a person detection process from an image;
executing a pre-determination process of setting a person determination detection frame in a moving body detection frame surrounding a moving body region detected from the image;
determining whether an image in the person determination detection frame is a person;
executing a final determination process of analyzing a distribution state in the moving body detection frame of the person determination detection frame determined to include the person in the pre-determination process; and
determining whether the image in the person determination detection frame is the person based on the analysis.

* * * * *